(12) United States Patent
Raman et al.

(10) Patent No.: US 8,560,455 B1
(45) Date of Patent: Oct. 15, 2013

(54) SYSTEM AND METHOD FOR OPERATING MULTIPLE RENTAL DOMAINS WITHIN A SINGLE CREDIT CARD DOMAIN

(71) Applicant: Digiboo LLC, Santa Monica, CA (US)

(72) Inventors: Mithila Raman, Dublin, CA (US);
David Rondan, Santa Monica, CA (US);
David P. Beddow, Santa Fe, NM (US);
Sam Edge, Santa Monica, CA (US)

(73) Assignee: Digiboo LLC, Santa Monica, CA (US)

( * ) Notice: Subject to any disclaimer, the term of this patent is extended or adjusted under 35 U.S.C. 154(b) by 0 days.

(21) Appl. No.: 13/713,569

(22) Filed: Dec. 13, 2012

(51) Int. Cl.
G06F 21/00 (2013.01)

(52) U.S. Cl.
USPC .......................................................... 705/59

(58) Field of Classification Search
USPC .......................................................... 705/59
See application file for complete search history.

(56) References Cited

U.S. PATENT DOCUMENTS

| | | | | |
|---|---|---|---|---|
| 6,389,403 | B1 * | 5/2002 | Dorak, Jr. ........................ | 705/52 |
| 6,587,837 | B1 * | 7/2003 | Spagna et al. .................. | 705/52 |
| 7,020,636 | B2 * | 3/2006 | Ohmori et al. .................. | 705/51 |
| 7,020,782 | B2 * | 3/2006 | Rajasekaran et al. ........... | 726/22 |
| 7,233,668 | B2 * | 6/2007 | Weinstein et al. ............. | 380/201 |
| 7,346,927 | B2 * | 3/2008 | Hillmer ............................ | 726/22 |
| 7,389,273 | B2 * | 6/2008 | Irwin et al. ...................... | 705/59 |
| 7,444,306 | B2 * | 10/2008 | Varble ............................. | 705/52 |
| 7,881,315 | B2 | 2/2011 | Haveson et al. | |
| 7,971,261 | B2 * | 6/2011 | Pestoni ............................ | 726/27 |
| 8,037,541 | B2 * | 10/2011 | Montague et al. ............... | 726/28 |
| 8,060,444 | B2 * | 11/2011 | Kalker et al. .................... | 705/51 |
| 8,131,993 | B2 * | 3/2012 | Kline et al. ...................... | 713/150 |
| 8,244,639 | B2 * | 8/2012 | Levy ................................ | 705/51 |
| 8,355,989 | B2 * | 1/2013 | Yoon et al. ....................... | 705/51 |
| 8,387,154 | B2 * | 2/2013 | Pestoni ............................ | 726/27 |
| 2002/0013940 | A1 * | 1/2002 | Tsukamoto et al. ............. | 725/5 |
| 2002/0026337 | A1 * | 2/2002 | Sasaki .............................. | 705/5 |
| 2002/0138379 | A1 * | 9/2002 | Yuasa et al. ..................... | 705/35 |
| 2002/0157002 | A1 * | 10/2002 | Messerges et al. ............. | 713/155 |
| 2002/0186843 | A1 * | 12/2002 | Weinstein et al. ............. | 380/201 |
| 2003/0076955 | A1 * | 4/2003 | Alve et al. ....................... | 380/201 |
| 2003/0078891 | A1 * | 4/2003 | Capitant ......................... | 705/57 |
| 2004/0049464 | A1 * | 3/2004 | Ohmori et al. .................. | 705/51 |
| 2004/0153650 | A1 * | 8/2004 | Hillmer ............................ | 713/176 |
| 2005/0065891 | A1 * | 3/2005 | Lee et al. ......................... | 705/59 |
| 2005/0071280 | A1 * | 3/2005 | Irwin et al. ...................... | 705/59 |
| 2005/0091164 | A1 * | 4/2005 | Varble ............................. | 705/52 |
| 2005/0182727 | A1 * | 8/2005 | Robert et al. ................... | 705/51 |
| 2005/0234826 | A1 * | 10/2005 | Ohmori et al. .................. | 705/51 |
| 2005/0240958 | A1 * | 10/2005 | Nguyen et al. .................. | 725/20 |
| 2006/0282391 | A1 * | 12/2006 | Peterka et al. .................. | 705/57 |
| 2006/0294594 | A1 * | 12/2006 | Andreaux et al. .............. | 726/26 |

(Continued)

Primary Examiner — Calvin L Hewitt, II
Assistant Examiner — Nancy Le
(74) Attorney, Agent, or Firm — John K. Fitzgerald; Fulwider Patton LLP

(57) ABSTRACT

A system and method for an all-inclusive, high speed and convenient delivery of digital content to a user is described. The system and method include software, firmware and communications technology for providing digital content to a user, monitoring and controlling an interface between the user and the system to provide for purchase or lease of digital content by the user as well as communicating and archiving all data necessary to accommodate accounting, billing and reporting functions. The system and method also provide for management of the assignment of digital rights management so as to allow rendering of the digital content on more than one device, and to allow the content to be rendered on a device that is not connected to a digital rights license management server.

7 Claims, 14 Drawing Sheets

(56) References Cited

U.S. PATENT DOCUMENTS

| | | | |
|---|---|---|---|
| 2007/0100701 A1* | 5/2007 | Boccon-Gibod et al. | 705/21 |
| 2007/0180519 A1* | 8/2007 | Boccon-Gibod et al. | 726/21 |
| 2007/0204078 A1* | 8/2007 | Boccon-Gibod et al. | 710/54 |
| 2008/0027869 A1* | 1/2008 | Kalker et al. | 705/59 |
| 2008/0162170 A1* | 7/2008 | Kumar et al. | 705/1 |
| 2008/0183629 A1* | 7/2008 | Kausik | 705/71 |
| 2008/0215491 A1* | 9/2008 | Miller | 705/59 |
| 2008/0250508 A1* | 10/2008 | Montague et al. | 726/28 |
| 2008/0288770 A1* | 11/2008 | Kline et al. | 713/150 |
| 2008/0310620 A1* | 12/2008 | Kim et al. | 380/28 |
| 2008/0313264 A1* | 12/2008 | Pestoni | 709/202 |
| 2009/0117846 A1 | 5/2009 | Mavrakakis | |
| 2009/0119784 A1* | 5/2009 | Galuten et al. | 726/33 |
| 2009/0165080 A1* | 6/2009 | Fahn et al. | 726/1 |
| 2009/0228396 A1* | 9/2009 | Miller | 705/59 |
| 2009/0274452 A1* | 11/2009 | Hamersley | 386/126 |
| 2009/0300767 A1* | 12/2009 | Galuten et al. | 726/26 |
| 2009/0327035 A1* | 12/2009 | Allard | 705/10 |
| 2010/0125529 A1* | 5/2010 | Srinivasan et al. | 705/317 |
| 2010/0138903 A1* | 6/2010 | Medvinsky | 726/6 |
| 2010/0205023 A1 | 8/2010 | Wagner | |
| 2010/0274668 A1* | 10/2010 | Langston et al. | 705/14.55 |
| 2010/0333211 A1* | 12/2010 | Schonfeld et al. | 726/28 |
| 2011/0131115 A1* | 6/2011 | Yamanaka et al. | 705/27.2 |
| 2011/0213962 A1* | 9/2011 | Pestoni | 713/156 |
| 2011/0258124 A1* | 10/2011 | Emmett et al. | 705/80 |
| 2011/0307393 A1* | 12/2011 | Galuten | 705/304 |
| 2012/0023519 A1* | 1/2012 | Hicks et al. | 725/31 |
| 2012/0131328 A1* | 5/2012 | Kline et al. | 713/150 |
| 2012/0173353 A1* | 7/2012 | Rausch et al. | 705/26.1 |
| 2012/0199647 A1* | 8/2012 | Hwang et al. | 235/375 |
| 2012/0233019 A1* | 9/2012 | Hwang et al. | 705/26.41 |
| 2012/0291142 A1* | 11/2012 | Seleznev et al. | 726/30 |

* cited by examiner

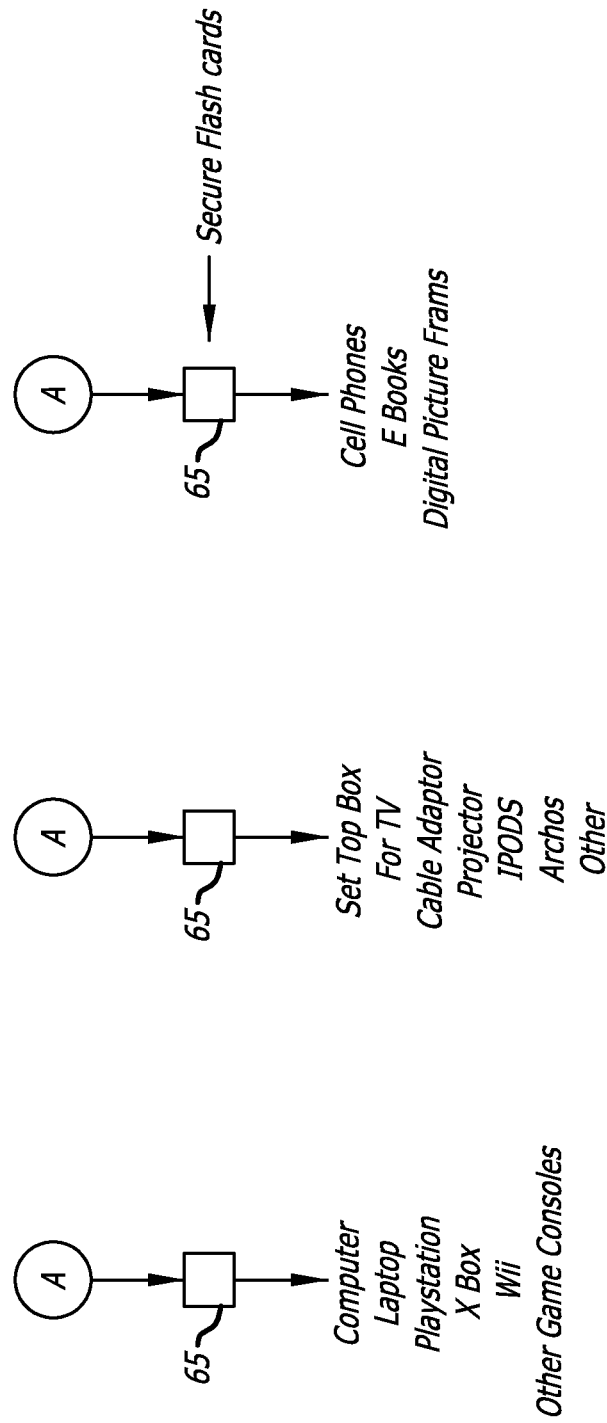

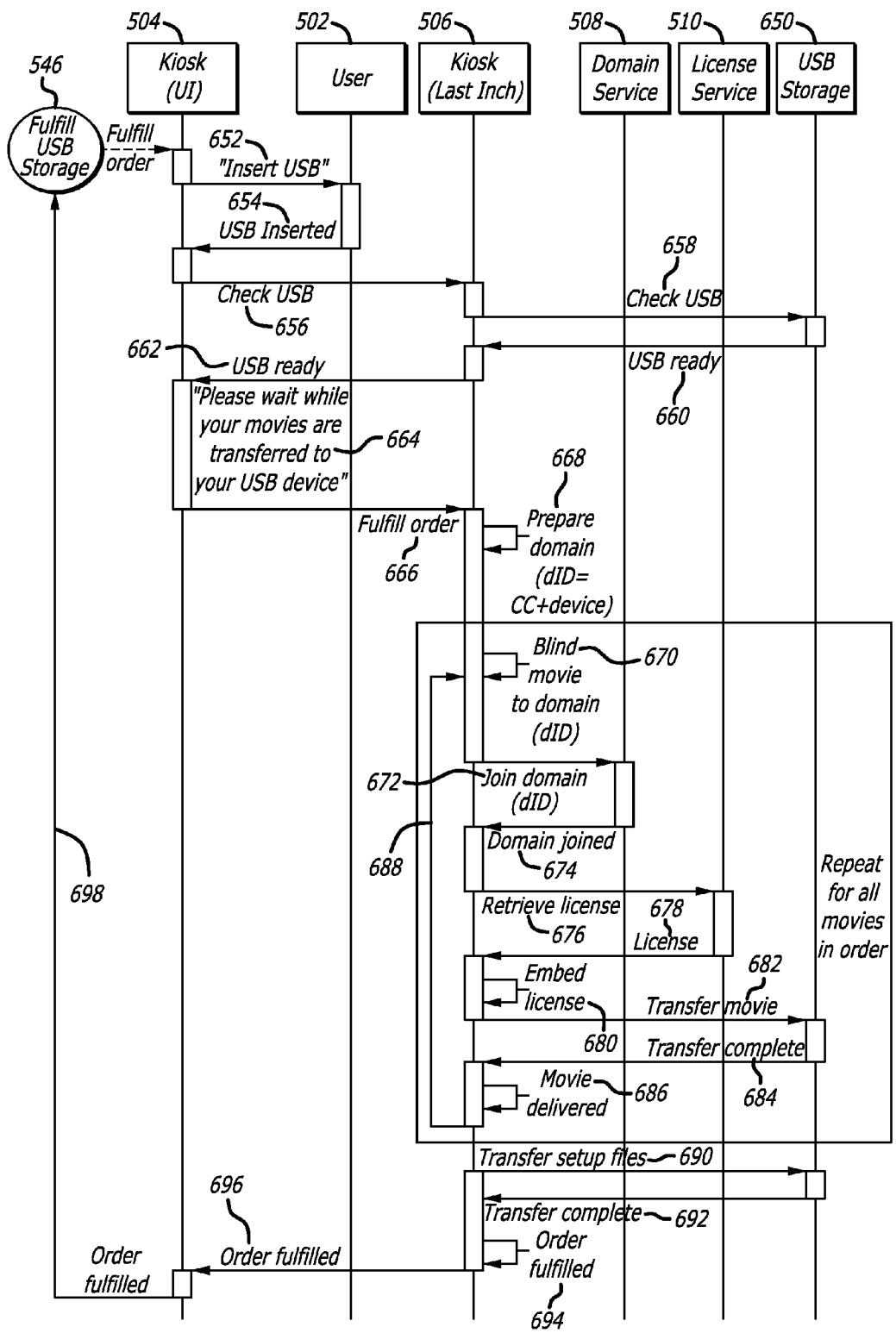

SYSTEM AND METHOD FOR OPERATING MULTIPLE RENTAL DOMAINS WITHIN A SINGLE CREDIT CARD DOMAIN

CROSS-REFERENCES TO RELATED APPLICATIONS

This application is related to U.S. application Ser. No. 13/713,436, entitled "Media Content Distribution and Management System," filed Dec. 13, 2012; U.S. application Ser. No. 13/713,477, entitled "Peer-To-Peer System for Sharing Media Content," filed Dec. 13, 2012; U.S. application Ser. No. 13,713,515, entitled "System and Method for Binding DRM Licenses to a Customer Domain," filed Dec. 13, 2012; U.S. application Ser. No. 13/713,389, entitled "Kiosk System for Distributing Media Content," filed Dec. 13, 2012; U.S. application Ser. No., 13/713,616, entitled "System and Method for Wireless Content Delivery and Transaction Management," filed Dec. 13, 2012; U.S. application Ser. No. 13/713,677, entitled "Digital Filling Station for Digital Locker Content", filed Dec. 13, 2012, the entireties of which are hereby incorporated herein by reference.

FIELD OF THE INVENTION

The present invention is directed to systems and methods for communicating and distributing large amounts of digital data, particularly data in audio, video or high definition audio or video formats, ebooks, emagazines, data for use in conjunction with computer or video games works of art, and other applications involving the downloading of large amounts of data or information to retail customers. More specifically, the present invention includes systems and methods for rapidly and accurately distributing and downloading such digital data upon purchase at a purchase point, which may be a dedicated device, such as a kiosk located at an airport, a mall, or other retail location through a wired or wireless connection to a portable device, such as a laptop, cell phone or the like, such that the digital data is downloaded onto a personal data memory device or wired or wirelessly to a personal portable device within a convenient amount of time approaching that which allows a customer to purchase the digital data and receive the download without an inconvenient wait.

BACKGROUND

Historically, the content of entertainment media has been distributed using electronic transmission systems, such as telegraph, radio, or television. The content of these transmissions are ephemeral, and are primarily intended for synchronous contemporaneous consumption by a consumer. More recently, such content has been embodied and distributed in a physical form, such as paper, vinyl, film, magnetic tape or polycarbonate discs. For example, music has been distributed using various forms of vinyl records, compact discs, magnetic tapes and DVDs. Television and movies have been distributed using various magnetic tape and DVD formats. By definition, these physical media needed to be inexpensive, safe, reasonably durable, capable of sustaining multiple uses, and to occupy the smallest physical volume possible for the purposes of shipping and storage.

The idea of using a physical medium that was reusable for the purpose of temporarily containing the media content for the "last mile" between the retail distribution point and consumer premises has previously not been economically viable. Such prior physical media provided no advantages of scale, no cost-effective storage at the customer's location or other factors that would make such a scheme viable. Instead, media transmission and storage systems developed around technologies that were incremental improvements on existing publishing models, such as books, piano rolls, and still photographs.

In each of the prior art media, the method and speed of replication, such as by printing press, record stampers and compact disc presses, drove the economy of scale which allowed the physical medium or container to become no more than a minor contribution to the final cost of goods, the price the customer was required to pay to enjoy the works performed, and to the cost of re-experiencing them "on demand" over a reasonably lengthy period of time.

Another approach to providing media content by providing reusable (that is, erasable) media containers such as erasable compact discs, DVDs or tape that would be filled with content on demand of a consumer has also proven unwieldy. The labor-intensive quality control required to reliably reuse erasable material was never justifiable. Providing such content is very unlike other analogous situations such as in the milk or soda delivery business, where the content is an easily standardized commodity and container cost is significant compared to the intrinsic value of the contents.

More recent media distribution systems have attempted to leverage the installed base of capital-intensive infrastructure. For example, home taping of audio content was an esoteric hobby practiced only by audiophiles with expensive open reel tape recorders until the Norelco/Philips compact cassette became inexpensive, ubiquitous, and evolved in stability and fidelity to the point that it became physically and economically practical to record music in pre-packaged format and distribute it to consumers.

Once inexpensive recording equipment and tape cassettes became available, consumer playback equipment, such as combination radio-cassette decks, made it practical to create mixed tapes for oneself and friends and to extend that customized listing experience to the home and the inside of a car moving down a highway. It is notable that until such radio-cassette players were available for the car, the only vehicle that was equipped by the manufacturer to provide entertainment other than spoken news and music through a car's radio was the Edsel by Ford Motor Company, which was available with an optional 45 rpm record changer shock mounted in the trunk.

Similarly, machines capable of recording television broadcasts soon assumed a cassette cartridge form and were mass marketed (originally ostensibly for time shifting purposes) and brought that capability into the average household. The resulting unanticipated re-purposing of the machines as a non-broadcast alternative distribution channel almost completely ignored the reusable capability of the physical media involved.

In each of the above mentioned examples, the common denominator that dictated a medium's success in the marketplace was the convenience, ease of use, and simplicity of operation that allowed a customer with no technical skills to enjoy the benefits of what had previously been a complex, sophisticated, and technically demanding mechanical challenge.

The advent of the Internet opened a new channel for distribution of media content. However, in its early days, most consumers were only able to connect to the Internet at relatively slow connection speeds. For example, even when dial-up connections to the Internet sported speeds of 56 kilobits per second, a significant improvement over early connection speeds, the only media that lent themselves to distribution electronically were text documents, low-resolution still images, and symbolic representations of real-time performances, including musical notation, midi files, and maps.

Recent improvements in technology provided inexpensive high speed broadband Internet connections to consumers and the development of internationally accepted standards for sub-band coding and compression of audio, such as, for example, Musicam and MP3, continuous tone still images, such as Group 3 fax and JPEG, and video, such as QuickTime, Real video, Windows media player, and the various MPEG formats, forever changed the economics of mass media distribution. The industry and technology continue to raise the bar, with high definition television, digital audio, portable media players, media playback capabilities on cell phones and laptop computers now being widely available at affordable prices. However, this new technology comes with a price, that is, the newer content requires vastly more bandwidth for transmission to consumers.

At present, a chasm has developed in the supply and demand systems that satisfy consumer needs for media distribution. People's expectations in terms of the availability of media on demand have been raised by their experience online using mechanisms like YouTube, iTunes and various search engines. However, only the highest speed optical fiber based broadband Internet access can reliably provide the same resolution of video and audio currently delivered by traditional disposable physical media, including CD's, DVDs, and Blu-Ray™ high definition DVDs. Although these physical formats are small enough to be transported from location to location, and even be enjoyed in a moving vehicle, the storage density, navigational speed, and lack of indexing by content leave much to be desired.

This problem of providing entertainment content has also been addressed previously by traditional brick and mortar institutions, such as Blockbuster. This approach, while successful for a time, is also experiencing problems as consumers become more conditioned to ease of selection available from on-line sources of content. For example, to rent or buy a DVD for viewing, a consumer typically goes to a specialized store having a large selection of DVDs to choose from. The consumer must then physically browse through the various titles until he or she finds one or more of interest, then stand in line to rent the material. The DVD must be returned to the store after a period of time to prevent incurrence of additional fees.

As early as the 1980s, systems were proposed to accommodate this problem and simultaneously increase the available breadth and depth of back catalog titles and new releases available to be distributed to a consumer using some form of "manufacture on demand" distribution in a user-friendly and convenient "kiosk" form factor. Such kiosks were designed to be initially located within traditional content resellers, such as, for example, record stores and videotape rental businesses, but the kiosk systems all suffered from a common problem, specifically, the replication speed required to produce a recording that could be carried away by a buyer was simply to slow to allow for timely and convenient purchase and delivery of the product. The time required to copy a selection, such as a music or film performance from an encrypted master disk, such as the customized twelve inch laserdisc jukebox system manufactured by Personics, or a customized cassette or CD was four to twelve minutes, a period of time that exceeded most buyers' patience, no matter how motivated the buyer was.

As broadband technology has progressed, consumers have come to expect shorter and shorter content delivery times as broadband connections have become increasingly faster. The rapid download speeds available for most content, such as textural and static graphical content, typically present on the World Wide Web, however, have conditioned consumers to expect downloads in real time, that is, the material is delivered to the consumer within seconds of its having been ordered by a mouse click or key stroke.

Customers are no longer satisfied with grainy, postage stamp sized video playback on their computers, televisions and other playback devices. High definition digital images have taken hold of the marketplace, now that high definition video and film content is widely available via over-the air-broadcast, satellite and optical media.

For the above reasons, consumers seem willing to accept services, such as Netflix, which allows movies to be ordered on line and then delivered by mail or the Redbox® vending machine scenario which requires significant maintenance and manual restocking. Use of such services however, requires planning and does not provide the consumer with a spontaneous real-time satisfactory experience.

The high speeds currently available through the Internet in some parts of the country allows consumers to use Internet streaming services from Netflix®, Blockbuster® and other; however, use of these services requires the consumer to be connected full-time to the Internet while streaming content. Times have once again changed, and today's consumers want convenience, quality, breadth of choice, price, compatibility, and portability. This desire dictates that the consumer be able to use their digital content in an unconnected environment; that is, having their digital content resident on a memory device or the rendering device itself.

What has been needed, and heretofore unavailable, is a system where a buyer can rapidly and conveniently search through a database of content to select content to purchase or lease that is then delivered to the consumer in a short, convenient time period of at most minutes, instead of hours. Such a system would include aspects designed to protect content owner's digital rights, and allow for playback on a variety of platforms. Additionally, depending on the whether the content is rented or purchased, the system could include a feature that would allow the consumer to easily add to the rental period or which would block the content from being played after the rental period has expired. The present invention addresses these, and other needs.

SUMMARY OF THE INVENTION

In its broadest aspect, the present invention includes a system and method for distributing digital content to a consumer at a transfer rate that provides for delivery of the content to the consumer in a short period of time, on the order of minutes, rather than the hours it presently takes to download data files of the size associated with high definition movies and television programs. In other aspects, the system and methods of the present invention include back office functions, such as inventory management, billing, monitoring and tracking. One particular aspect includes a secure flashcard that is capable of rapid acceptance of content and that can interface with a user's rendering equipment. An example of such a secure flashcard includes USB technology. In still another aspect, the system and method includes wired or wireless delivery to a wide variety of consumer rendering devices.

In still another aspect, the invention includes a method for providing digital content to a user, comprising: providing digital content in a searchable database located on a server in communication with a user-accessible point of delivery; providing software programs for configuring the operation of a processor and associate memory to facilitate provision of user-selected digital content to the user, including programs for allowing a user to search the searchable database of digital content, programs for controlling the retrieval of digital content from the searchable database, programs for managing the searching and selecting process, programs for tracking the searching, selecting and delivery processes, programs for monitoring inventory, including remote stocking and re-stocking, programs for providing accounting functions associated with the delivery of the selected digital content, including functions associated with buying and/or leasing the selected digital content, including operations related to communicating with and charging or debiting a user's bank account or credit card, programs for providing digital rights management of the provided digital content, and programs for providing reporting of inventory usage, revenue generation and expenses and any other reports necessary to track usage, and in the case of a lease of the digital content, track the term of the lease, or to incorporate within the download of digital content to a user supplementary content that would result in the deletion of the downloaded digital content at the end of the term of a lease; wherein the user-accessible delivery point includes facilities for local storage of digital content, interface means for allowing the user to interface with the system for searching for and selecting digital content to be delivered, and for providing a means for the user to purchase or lease the digital content, including means for charging the user's credit or debit account for an amount associated with the lease or purchase of the digital content; and a communication port configured to allow for rapid downloading of digital content to a portable memory device such as, for example, a USB thumb drive by wired connection for use with a user's digital content rendering devices or wired or wirelessly to a user's personal portable content rendering device.

In a further aspect, the invention includes a customer point of content delivery system for providing digital content to a customer, comprising: a user-interface, including input and output capabilities, an escrow controller; an output configured to interface with and communicate with a portable digital content storage device or rendering device; a processor configured to operate in accordance with software to control the display of content on the user interface and to accept user input, the processor responsive to the user input to control the display of information to the user and to control the escrow controller to provide for downloading user selected digital content through the output. In another aspect, the controller is in communication with a server, the server being part of a digital content supply system for supplying digital content to the delivery system for delivery to the user through the output, the server also being part of management control system for managing, monitoring and controlling the delivery of digital content to the user and for managing, monitoring and controlling purchase or lease processes associated with delivery of the digital content to the user. In an alternative aspect, the user-interface may be configured to facilitate interaction between the system and a user by way of a touch-screen.

In still another aspect, the invention includes a method for that allows a digital rights management license to be associated in a way that allows rendering of an item of digital content without having the rendering device in direct connection with the digital rights management license server. Such a method is advantageous in that the rights license may be arranged so as to allow rendering of the digital content on more than one device, provided that all of the devices are registered with the system and have been given unique device domains. In another aspect, it allows the digital content to be embedded into the digital content so that the license becomes portable with the digital content.

In yet another aspect, the invention includes a method for providing transportable digital rights management licenses for providing for playback of licensed digital content on a rendering device in the absence of a connection to a network connecting the content rendering device with a digital rights management license server, comprising: assigning a rendering device to a unique device domain; receiving a credit card number from a customer; generating a hash of the credit card number; associating the unique device domain with the hash of the credit card number to create transaction domain; and associating a digital rights management license with the transaction domain.

In a further aspect, the invention includes embedding the digital rights management license in a selected item of digital content; and communicating the selected item of digital content with the embedded digital rights management license to a customer.

In a still further aspect, the invention includes communicating a digital content player configured to render digital content in viewable form only if the digital content being viewed includes an embedded digital rights management license to the rendering device having the assigned unique device domain.

In yet another aspect, communicating the selected item of digital content with the embedded digital rights management license to the customer includes downloading the selected item of digital content with the embedded digital rights management license to a portable memory. In still another aspect, communicating the selected item of digital content with the embedded digital rights management license to the customer includes downloading the selected item of digital content with the embedded digital rights management license to a rendering device.

In yet a further aspect, the invention may also include receiving an indication from a customer that the customer is renting a selected item of digital content; and wherein the transaction domain includes only a single unique device domain.

In still another further aspect, the invention includes receiving an indication from a customer that the customer is buying a selected item of digital content; and wherein the transaction domain includes at least one unique device domain.

In yet another aspect, the invention includes a method for providing transportable digital rights management licenses for providing for playback of licensed digital content on a plurality of content rendering devices in the absence of a connection to a network connecting the content rendering devices with a digital rights management license server, comprising: receiving credit card information from a customer; retrieving information related to a group of rendering devices consisting of one or more rendering devices registered to the customer, each of the registered rendering devices having an associated unique device domain; generating a hash of the credit card information; generating a transaction domain by associating the hash of the credit card with the unique device domains of each of the rendering devices registered to the customer; associating a digital rights management license with the transaction domain, the associated digital rights management license being linked to each of the unique device domains to allow rendering of licensed digital content on each of the registered devices; and embedding the digital rights management license in an item of digital content to be delivered to the customer.

In still another aspect, the invention includes a processor including a program of instructions undertaking method acts for creating a transportable digital rights management license, comprising: receiving credit card information from a customer; retrieving information related to a group of rendering devices consisting of one or more rendering devices registered to the customer from a memory accessible by the processor, each of the registered rendering devices having an associated unique device domain; generating a hash of the credit card information; generating a transaction domain by associating the hash of the credit card with the unique device domains of each of the rendering devices registered to the customer; associating a digital rights management license with the transaction domain, the associated digital rights management license being linked to each of the unique device domains to allow rendering of licensed digital content on each of the registered devices; and embedding the digital rights management license in an item of digital content to be delivered to the customer. In a further aspect, the method acts may also include downloading the item of digital content with the embedded digital rights management license to the customer.

Other features and advantages of the invention will become apparent from the following detailed description, taken in conjunction with the accompanying drawings, which illustrate, by way of example, the features of the invention.

BRIEF DESCRIPTION OF THE DRAWINGS

FIGS. 1A and 1B are block diagrams representing one embodiment of the overall architecture and data flow of the present invention, graphically showing various servers, networks and distribution kiosks for delivery digital content from content providers to end-consumers.

FIG. 7C is a block diagram illustrating an exemplary sequence of operations that occur during a fulfill USB delivery process of FIG. 7A.

DETAILED DESCRIPTION OF THE PREFERRED EMBODIMENTS

Figure 1A:
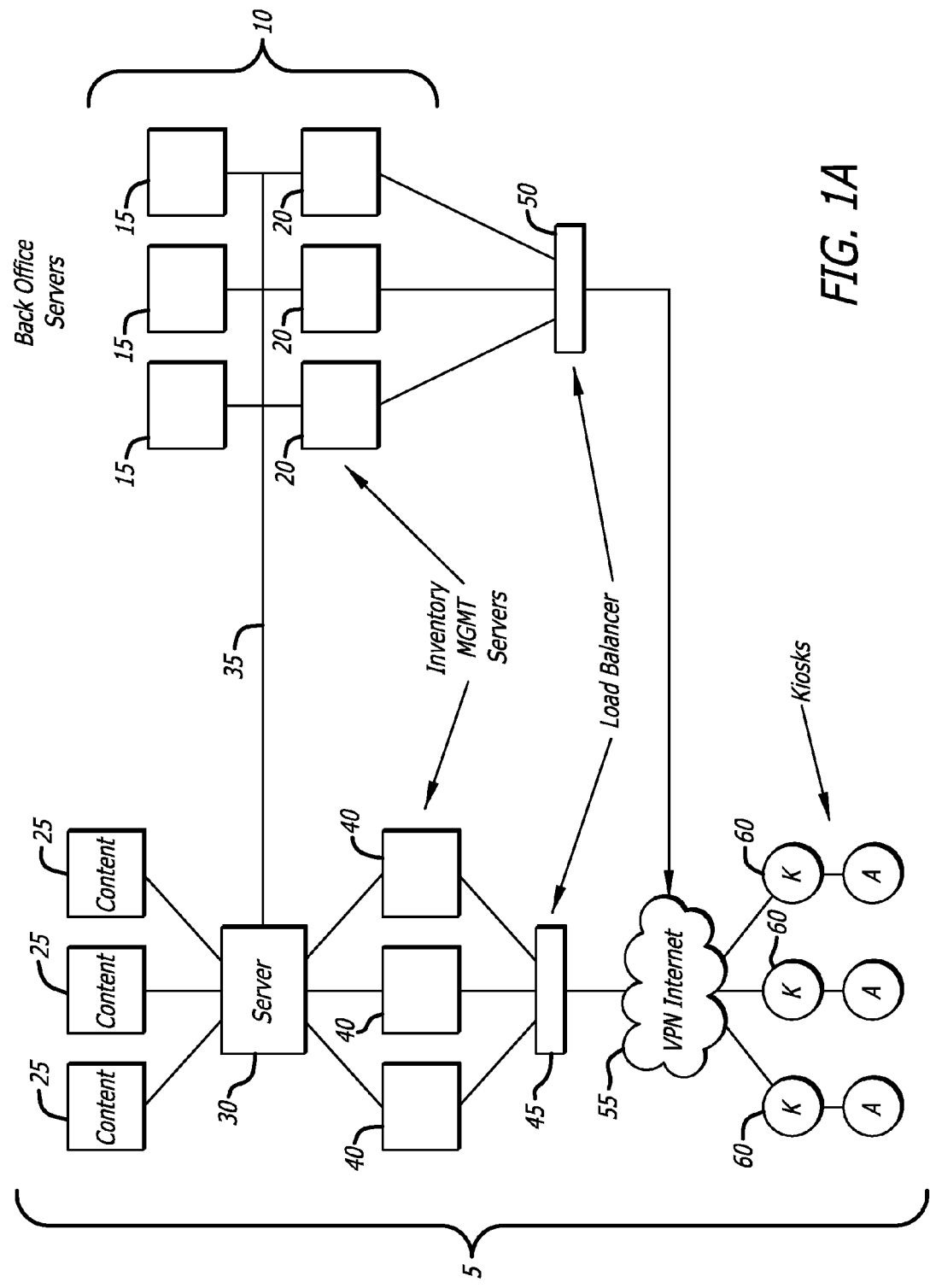

Referring now to the drawings in detail, in which like reference numerals indicate like or corresponding elements among the several figures, there is shown in FIG. 1 one embodiment of a distribution system for providing digital content to a consumer in a convenient manner that reduces customer waiting time while the content is downloaded to a portable format while still providing breadth of choice and low price.

As shown in FIG. 1, the distribution system typically includes a content delivery portion 5 and a back office management portion 10. Back office management portion will include one or more servers, databases, data storage, printers, input devices and other equipment 15 that are interconnected using appropriate high speed connections, such as are provided by Ethernet or other networking and communication systems that are well known in the art. Additionally, back office management portion 10 also includes servers and databases 20 that provide for inventory management and tracking of digital content sales or rentals. Those skilled in the art will understand that while the back office management portion 10 is described as having servers and databases that are separate from the inventory management servers, such servers may be included in the same machine or database, depending on the software and hardware being used.

Referring now to content delivery portion 5, FIGS. 1A and 1B illustrate that content delivery portion 5 includes a server 30 that has access to various content databases 25. Communication with content databases 25 may be accomplished through dedicated communication lines, or alternatively, high-speed Internet or Ethernet communication systems, which may be either wired or wireless. Server 30 of content delivery portion 5 is also in communication with management portion 10 through communication link 35. The communication link 35 may take several forms. For example, communication link 35 may be either hardwired or wireless, and provide communication to management portion 10 or other parts or sub-parts of the system in accordance with the present invention. Alternatively, content delivery portion 5 may communicate with management portion 10 through wired or wireless Ethernet or Internet connections. In this manner, the servers 15 of management portion 10 may be updated with information from content delivery portion 5 with information appropriate to the delivery of the content in the ongoing running of the business. For example, data communicated over communication line 35 may include not only ordering and leasing information, but also may include, without limitation, delivery information, inventory information, availability of various content information and other information required to provide for the content delivery and subsequent billing and other back office operations in a cost effective and efficient manner.

Along this line, inventory management servers 40 are also connected to server 30 of content delivery portion 5. These inventory management servers may be similar or identical to inventory management servers 20 that form a portion of the management portion 10 of the system. Those skilled in the art understand that while content delivery portion 5 or management servers 40 have been depicted separately from the inventory management servers 20 of management portion 10, these servers could indeed, be located either in actual or virtual fashion on the same server. Such an integrated server may also be physically located, or virtually located, in either the content delivery portion 5 or the management portion 10 of the system of one embodiment of the present invention. It will also be understood that the various component portions of various embodiments of the present invention may also be included as part of an integrated system, where back office servers 15, inventory management servers 20 and 40 and content delivery portion server 30 all reside on the same machine or network of machines through appropriate software, the functions of the various servers being provided from a single location.

Referring again to FIG. 1, inventory management servers 40 of content delivery portion 5 are in communication with other portions of the system through load balancer 45. Such load balancers are well known by those skilled in the art, and thus do not need to be described in detail herein.

Similarly to load balancer 45, load balancer 50 provides for a gateway to the servers of the management portion 10. Both the management portion 10 and the content delivery portion 5 are in communication with various content delivery stations that are accessible by computers through the Internet 55. As those skilled in the art will understand, to provide for a secure connection between the various servers of the content delivery portion 5 and the management portion 10, Internet connectively may be provided, for example, through a secure encrypted Internet connection In one embodiment of the preferred invention, customers interface with the content delivery portion 5 of the system using a kiosk or kiosks 60 that are positioned in a consumer accessible location. For example, kiosks may be located in malls, grocery stores, gas stations, and the like, or in any other publicly available space warranted by consumer traffic.

As will be described in more detail below, a customer may interface with the content delivery system 5 at kiosk 60 (FIG. 1A) through the use of a USB flash card block 65 (FIG. 1B). Devices have flash memory are well known and in common use as portable storage media. For example, devices known as "USB thumb drives" utilize flash memory. Flash memory cards are available in several different footprints, and various interface or connection standards are used to store and retrieve information in their flash memory. Such cards also include additional ancillary processors and circuitry to control the flow of date into and out of the flash memory of the card. Alternatively, block 65 may be a wireless communications device such as, for example, but not limited to, a Wi-Fi or BlueTooth® transceiver that wirelessly delivers the content directly to a user's personal portable rendering device.

Kiosks 60 may also include data ports that are configured to accept the flash cards 65 to enable digital content to be downloaded into the flash card 65 at the kiosk. Additional details of the components of various embodiments of kiosks 60 will be described in more detail below.

Once the customer has completed their transactions at the kiosk and digital content has been downloaded into the USB flash card 65, the USB flash card may then be taken by the consumer on an airplane, to his or her home, or elsewhere and used to provide content to, for example, computers and various console devices, such as the Sony PlayStation 3® the Microsoft X-box or X-box 360®, and the Nintendo WHO, among other game consoles. Alternatively, the USB flash card 65 may be used in conjunction with a converter for providing content to devices which may not interface directly with the secure flash cared, such as a television or other rendering device lacking an appropriate connector to connect to the secure flash card. Similarly, the secure flash card 65 may also be used to provide content for a projector or rendering systems, such as the system manufactured by ARCHOS, that have connectors that will allow the flash card to be connected to the rendering device.

Additionally, use of the secure flash card 65 in accordance with the several embodiments of the present invention to provide content to a user's rendering device is not limited to devices commonly thought of as content display devices, such as mentioned previously. For example, the secure flash card 65 may also be configured to interface, for example, with cell phones, e-books, and digital picture frames, among other devices, to allow rendering of the digital content stored on the secure flash card 65 on those devices.

The system described in the various embodiments above operates as follows to provide digital content to a consumer. Media content in the form of either audio or visual media or other media types that may become available the future, will be acquired by the provider of the system of the present invention and would be appropriately compressed, encrypted, and watermarked, with appropriate digital rights management information added, and stored on content servers 25 of content delivery portion 5. The media would then be distributed through server 30 on a store-and-forward basis using a variety of existing secure electronic content distribution networks to kiosks 60 that are prominently placed in high-volume, high traffic locations such as, for example, grocery stores, gas stations, and coffee shops.

The form factor, or footprint, of the kiosk can take a variety of shapes and sizes. Kiosks will typically have a local storage component, such as a database or local server that is contained in a secure service area or within the kiosk and inaccessible to retail customers. Customers will access the processor of the kiosk using, for example, a touch screen interface to search for and identify digital content that the customer wished to buy or lease. Once the customer selects the digital content they wish to buy or lease, the customer places a secure flash card into a flash card connector and the digital content, along with any other information, such as may be required to manage or monitor the transaction, along with any digital rights management conditions or software required, is downloaded into the memory of the secure flash card or delivered wirelessly to the user's personal portable rendering device. Alternatively, the customer obtains the secure flash card from another source, even a different kiosk, and uses that flash card to store the downloaded digital content. As will be discussed in more detail below, the management portion 10 of the system of the present invention is capable of identifying the flash card and tracking its use so as to perform various back office functions, including inventory management, accounting, billing and other pertinent functions required for manage and monitor retail transactions with a customer.

In some embodiments, kiosks 60 may include capabilities for allowing the consumer to use coin or other forms of cash to pay for content delivery. However, given the ready availability of ATM credit cards and other forms of card-based cash or credit equivalents, it is anticipated that in most cases, kiosks will only accept a credit or ATM debit card, thus eliminating the need to store cash or to service the kiosks to provide additional cash as cash is used up by consumers. This provides the advantage of not only eliminating costly cash replenishment, but also provides additional security and eliminates the temptation for theft from the kiosks. As the secure flash card is inherently secure, multiple credit numbers, debit numbers, PINS, biometric factors or unique codes can be stored on the secure flash card or may be stored on the user's personal portable rendering device as well, eliminating the need for use of separate payment systems.

Figure 2:
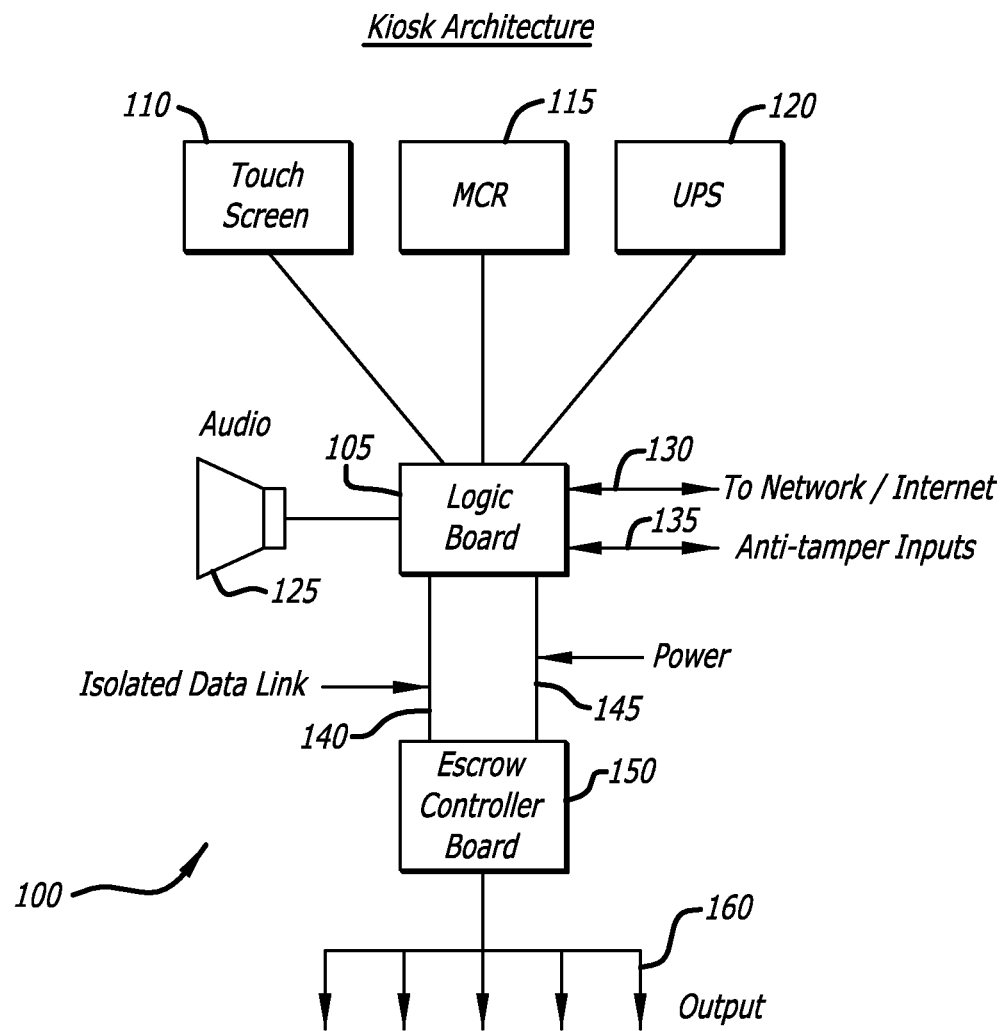
FIG. 2 is a block diagram illustrating one embodiment of the architecture of a distribution kiosk of FIG. 1A.

Referring now to FIG. 2, a block diagram illustrates the systems and sub-systems of one embodiment of a kiosk in accordance with the principles of the present invention. Typically, a kiosk will included, as stated previously, an interface to allow a customer to access a listing of the digital content available from the kiosk, and to select from the list of available content one or more items to be purchased or leased. For example, as shown in FIG. 2, the kiosk includes a touch screen 110 for displaying the list of content and allowing the customer to select the content by touching the screen. Such touch screens are commonly used, and thus will not be described in detail here.

The kiosk also includes a memory storage device 115, which may take whatever form is most appropriate for the size and expected usage of the kiosk. For example, the memory storage device 115 may be a very large capacity hard drive or several hard drives as needed to provide the required amount of data storage. The kiosk may also include an uninterruptible power supply 120 to ensure that, in the event of a power failure, no data is lost from the memory and perhaps even to provide for operation of the kiosk in the event of a power failure.

The circuitry of the kiosk 100 also includes a logic board 105 that includes a processor and typically will include a working memory of some kind, such as RAM memory. Various communication lines will connect the logic board 105 to the other subsystems of the kiosk as shown in FIG. 2, including, for example, an audio output device 125, such as a loud speaker.

Logic board 105 is connected to the content delivery portion 5 of the system illustrated in FIG. 1A by communication line 130. This communication line may take the form of a secure Internet, Ethernet or other high bandwidth connection, and may be either wired or wireless. The high bandwidth connection may be provided by either a dedicated private connection or a public connection using appropriate data security hardware and software. Additionally, in some embodiments, communication line 135 may provide access to additional anti-tampering inputs, including mechanical tamper switches, shock sensors and environmental sensors.

Logic board 105 is connected through an isolated data link 140 to an escrow controller board 150. Escrow controller board 150 provides a local cache to receive digital content from the memory 115, or other source, such as the Internet, to secure flash card connectors 160 configured to connect to and provide communications between a secure flash card, such as has been previously described, and the circuitry of the kiosk. Isolated data link 140 provides security from attack by a hacker trying to access the logic board of the kiosk through the secure flash card connectors 160. As shown in FIG. 2, the escrow controller board 150 may be powered by the power supply of the logic board by power line 145. Alternatively, the escrow controller board 150 may be powered by a separate power supply, or a spur from power supply 120.

Several advantages are provided using the logic board and escrow controller boards as described with reference to FIG. 2. For example, the escrow controller board 150 of the kiosk is isolated from the logic board of the kiosk and thus also isolates the secure flash connectors 160 from the logic board 105. This helps secure the kiosk from attacks using the secure flash card connectors 160 to attempt to penetrate the system. In other words, use of the escrow controller board 150 provides a level of security to the operation of the kiosk in such a manner that the remainder of the system, including the content databases, servers, inventory management servers, and back office/management servers are isolated from interference by someone who may wish to penetrate the system and either steal information from those servers or takeover the system to use for their own purposes.

This escrow system may also be implemented by logical means, rather than electrical means, by use of multiple virtual machine images running under a controller on the same processor hardware and software. In this way, the process running the kiosk implementation has no direct access to the secure flash connectors 160, and success by an attacker in compromising the process transferring the content to the flash memory cards does not result in a breach of the main kiosk functionality or provide access to transaction information.

Various methods of communicating digital content from the content servers 25 of the content delivery portion 5 of the system illustrated in FIG. 1A are contemplated. As stated previously, in order to provide a wide breadth of selection of digital content to a prospective customer, a large number of titles must be made available from the kiosk 60. Thus, the data stored in the memory 115 of the kiosk must be managed as new titles are added and old titles are deleted. Server 30 (FIG. 1A), in cooperation with inventory management servers 40, and the various systems of management portion 10, will communicate with the various kiosks of the system to update and manage the inventory of the system. In one embodiment, for example, new digital content may be communicated during off-hours to take advantage of lower transmission rates and readily available bandwidth. In other embodiments, where feasible, dedicated high speed connections may be used to ensure that high speed downloading of digital content can be accomplished. Alternatively, a variety of methods may be used under the control of the content delivery system 5 to ensure that a wide range of titles are available at the kiosk for immediate download to a customer.

In alternative embodiments, the kiosk may provide the customer with the capability of requesting a specific title that is not immediately available from the kiosk. In this case, the logic board of the kiosk can communicate to the customer that the content can be made available, with an estimated wait time so that the customer can choose to wait, or come back at a future time to download the content. In still another embodiment, the content delivery portion 5 may take note of various requests for content not immediately available and may, in cooperation with the various inventory management servers and management portion 10, request that the content be obtained and downloaded to the kiosk during the next scheduled update of the digital content stored in the memory of the kiosk. In still other embodiments, this feature may be implemented with other user interfaces, including through a web site, telephonically, email or SMS (secure message system) text requests. One embodiment of the system could also allow the requested content to be downloaded at multiple points simultaneously, providing for increased convenience to a consumer by increasing the locations the consumer can receive the download. In other words, such an embodiment would allow the consumer to place an order at one location and receive the downloaded content at another location. For example, a consumer running errands to pick up the download at any kiosk within a reasonable geographical area, rather than requiring the consumer to return to a particular kiosk.

One important aspect of the present invention includes the software systems incorporated into not only the servers of the content delivery portion 5 and management portion 10, but also into the logic board 105 and escrow controller board 150 of the kiosks. For example, it is possible to incorporate various digital right management (DRM) processes, such as, for example and not limited to, Microsoft® PlayReady®, in the system to protect the downloaded content from inappropriate copying or alteration by users of the system. For example, in one DRM system, both content data and content key information, where the content key information is used to protect the contact data from unauthorized copying or alteration, can be downloaded simultaneously onto the memory storage or rendering device. Using such a system, a user would get encrypted data content. When the user desires to play the encrypted data content back, the user would need to have the right to access the encrypted content, access which would be granted by providing the key once the purchase or rental transaction had taken place on a domain bound license basis. Of course, there are many digital rights management systems currently available for use, and the various embodiments of the systems of the present invention are capable of being adapted or upgraded to allow their use. This ability to upgrade the systems is also useful in that the systems may be upgraded to use future digital rights management systems developed in the future. Moreover, since content owners may select differing digital rights management systems for their content, the system will also be able to simultaneously support different digital rights management systems so that the wider choice of content can be made available to a consumer for purchase or rent.

Figure 3:
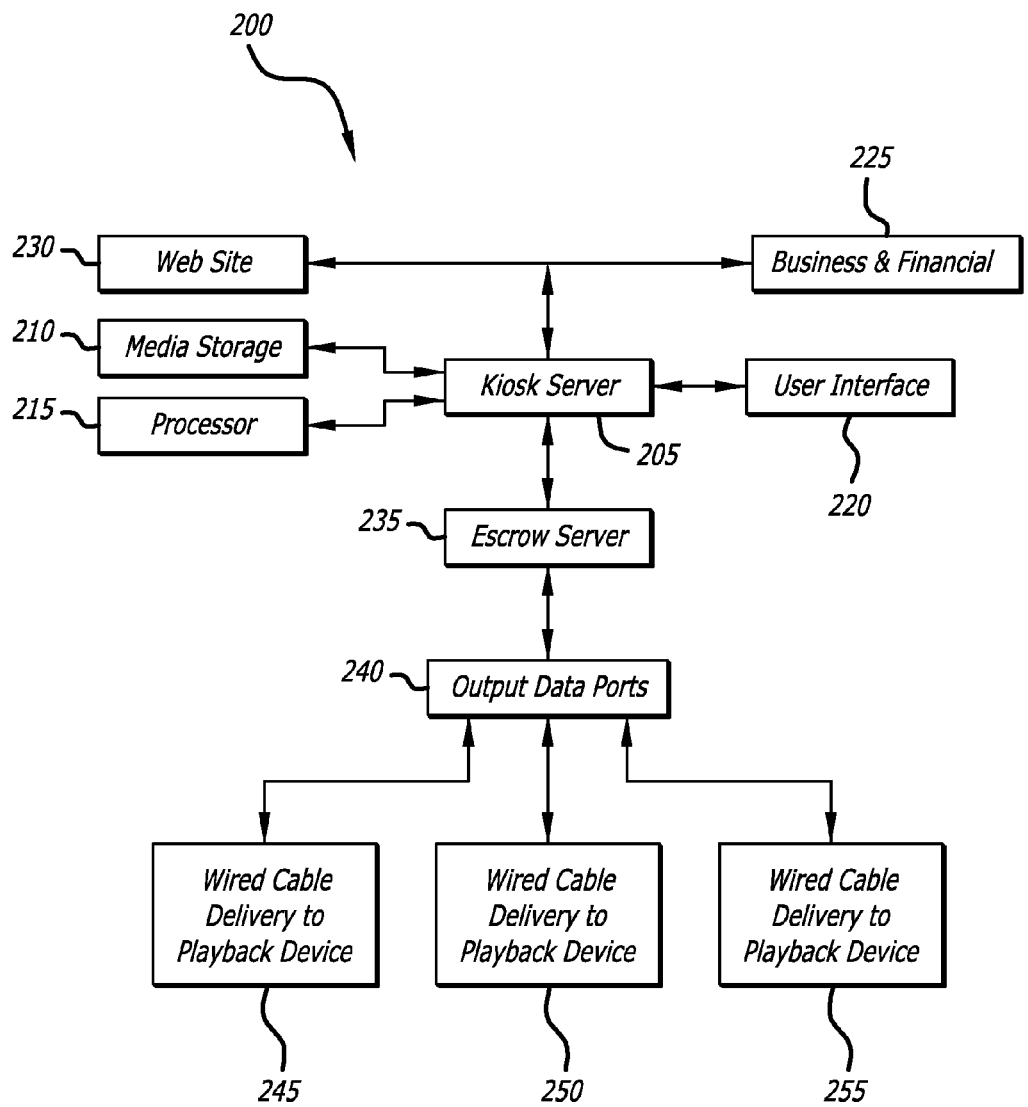
FIG. 3 is a block diagram of one embodiment of a secure flashcard in accordance with the present invention showing various components, data flow and connections.

Referring now to FIG. 3, another embodiment of a kiosk content delivery and license management system 200 and method is described. The kiosk includes a local kiosk server 205 driven by a processor 215 that is configured to run and operate software commands comprising a Content Distribution System (hereinafter "CDS"). The processor is in communication the server 205. The server 205 may include its own processor, the server running under the control of software commands comprising a Content Management System (hereinafter "CMS"). The server is also in communication with media storage 210, which may be integral to the server 205, or which may be separate from the server 205. Storage 210 may be a hard drive, an array of hard drives or other type of storage known to those in the art. Alternatively, storage 210 may be "in the cloud", that is, located remotely from the server yet in communication with the server over a network, such as a LAN or the Internet.

The content management system running on the server may operate independently of other kiosks, where there is more than one kiosk connected via a wired or wireless network. Alternatively, where there is a kiosk peer group, defined as a group of kiosks at a location, such as an airport, any one of which may be accessed by a user, the content management system may operate to control all of the kiosks in a peer group. The content management system is responsible for managing digital content delivery, metadata and software loading, change management and any modification or updates to the system as deemed necessary or desirable.

A user-interface 220 is in communication with server 205 to control the display of locally stored content metadata, including, without limitation, customer service FAQs, advertising and other information as deemed necessary or desirable on the user interface and to accept user input via a touch-screen, magnetic card reader, voice commands or remotely by way of wireless access of the kiosk from a portable device.

Utilizing the user-interface, a customer may, among other tasks, register a device to their digital rights management device domain, browse, search, select and transact to purchase or rent digital content, access an UltraViolet® account, seek customer assistance or otherwise interact with the various sub-systems of system 200 that are provided by the system operator.

One or more computers or servers 225 running appropriate software that provides commands for carrying out the functions to support the business and financial aspects of the content delivery system are in wired or wireless communications with server 205. Servers 225 may be constant communication with server 205, or they may communicate with server 205 on a scheduled basis. Servers 225, and the software programs running on them, communicated with the content distribution system and the content management system to receive, record and respond to all user-interface requests for the purpose of processing transactions. Also running on the server or server 225 is software for carrying out the functions of a digital rights management and device domain control system. This system handles managing the device domain for each customer, and facilitates the processing and assignment of digital rights management and the issuance of licenses for content that is leased or purchased by a user.

Also in communication with server 205 is an escrow controller 235. Escrow controller may include its own integrated processor and memory, or it may be embodied in a software program running on server 205. Escrow controller 235 assists in managing, monitoring and controlling the purchase or lease processes associated with the delivery of the digital content to a customer. These processes include, but are not limited to, accounting and reporting functions, assisting in credit card, debit card, loyalty card and coupon processing and clearance, UltraViolet® account access and other financial processing. The escrow controller also facilitates delivery of encrypted digital contain with a domain bound digital rights management license, as well as providing additional security and isolation when embedding a digital rights management license in an encrypted digital content file for delivery to the customer.

The system 200 also includes an output port 240 for delivering digital content to a customer. Output port 240 is in communication with the escrow controller 235 to facilitate data flow from escrow controller 235 through the output port to a portable device such as a portable computer or storage device, where the portable computer or storage device stores the purchased or leased encrypted digital content file which can then be rendered, under user control, in accordance with usage rules contained in the embedded digital rights management license.

The output port may be configured in various manners to facilitate data flow to a customer. For example, output port may be configured to provide a high speed USB port 245, or alternatively may provide a high speed tethered or USB cable that may be plugged into a portable device 250 to allow the device to receive purchased or leased digital content.

In another embodiment, output port may be connected to electronic circuitry such as a wireless transceiver 255. The wireless transceiver may be configured to communicate with a customer's portable rendering device or storage media utilizing any public or proprietary protocol such as, for example, but not limited to, 802.1x, Wi-Fi, W-Max, LTE, Bluetooth, CDMA, DPD, TDMA, GSM, EV-DO, EV-DV, GSM Edge, 3GSM and the like. In this manner, the system may wirelessly stream digital content to a customer's portable media device such as a portable computer, tablet, smartphone, personal digital assistant, pager or any other device capable of wireless communications.

The system also includes an operator controlled website 230 that allows the consumer, among other necessary and desirable activities, to create an account, register devices, link to their Ultraviolet™ account and transact for digital contact that will subsequently be delivered through the kiosk to the user's portable storage or rendering device. The programs running on website 230 to allow the user to communicate with the financial and operating back office systems that control the financial aspects and monitoring aspects of the various transactions that may be accomplished through user interface 220.

Although not shown in FIG. 3, one embodiment of the present invention includes a software player application that is delivered to the users portable rendering or storage device either through wired or wireless communication. Typically, this software player application will be delivered to the users device when the user registers for the first time with the system. The player application is downloaded as part of the registration process and will be used to render the digital content that the user purchases in accordance with the digital rights management granted to the purchaser of the digital content through the purchase or rental process.

The software player application is a small program containing software commands that allows the user's portable rendering device to play back the digital rights that are purchased or rented by the consumer. The software player application allows the user to receive content from a kiosk via a USB memory device transfer or Wi-Fi wireless download to a rendering device. The software player application may also include software commands that allowed the consumer to control the order in which Wi-Fi downloads occur from the system to the user's portable storage or rendering device. Other functions of the software player application include allowing the user to pause, resume, or cancel a Wi-Fi download.

The software application may also include commands that display lists of content items that have been rented or purchased by the consumer as well as allowing the user to review descriptive data about a contact content item, such as images, actors, directors, duration of the digital content, genre, language, synopsis, rating and release date. Various commands included in the software player application will allow the user to begin or resume viewing of the content item, or to delete the content item.

The software player application may also act as an interface between the consumer and the website 230, and in turn the servers 225, to allow the user to view credit card domains to which the device is associated as well as devices associated with a credit card domain and or associate a device with the credit card domain.

The software operating the software player application may also monitor the expiration date of a digital content lease and automatically delete content items that have expired. Another function of the software player will be to allow the user to consolidate content and descriptive data from USB-ward network-attached storage devices to a single location on the client device. The software application player may also allow the user to export content and descriptive data for subsequent import onto other registered devices, and to allow the user to import content and data previously exported from another registered device.

Figure 4:
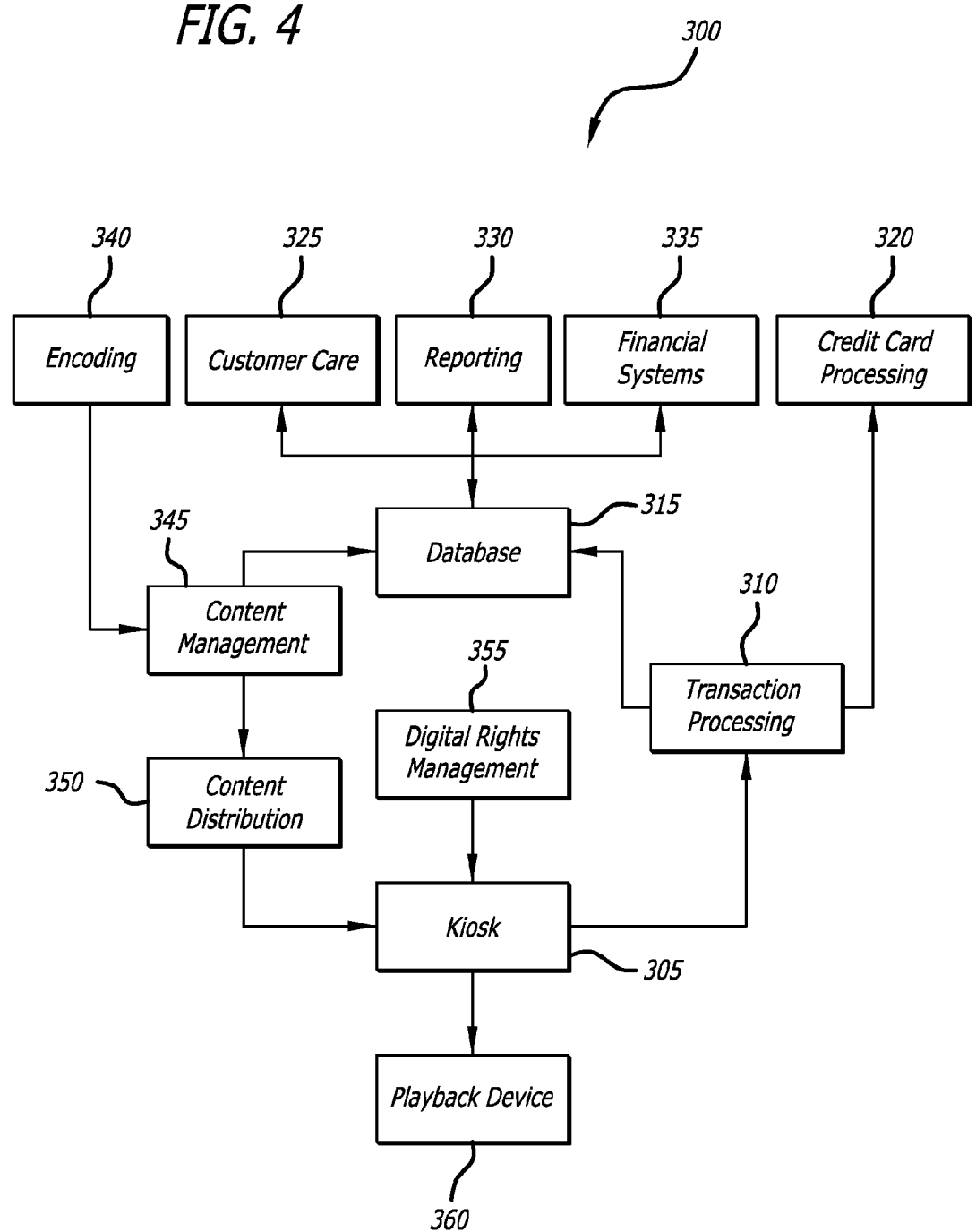
FIG. 4 is a block diagram illustrating another embodiment of a digital content distribution system.

FIG. 4 is a block diagram illustrating various systems making up another embodiment of a digital content distribution system 300 in accordance with the principles of the invention. System 300 includes, as described above, a kiosk 305 which provides an interface and content distribution system accessible by consumers. The processor(s) and server(s) of the kiosk are in communication with a variety of other systems for managing the transaction between the consumer and the delivery of content to the consumer. For example, a consumer may interact with kiosk 305 to carry out a purchase or lease transaction. Data representative of this transaction is communicated to a transaction processing system 310. The transaction procession system 310 in turn communicates with a credit card processing system 320. Credit card processing 320 acts as an interface between the content distribution system and the consumer's credit providing facility, such as a bank or other entity, and carries out the processes necessary to ensure that the consumer's credit card is charged appropriately for the purchase or lease transaction.

The transaction processing system 310 provides data related to the transaction for storage in a database 315. As shown in FIG. 4, database 315 serves as a repository for all of the information generated concerning not only an individual transaction, but also contains data related to the consumer, the consumer's transaction history, and what devices and credit cards or other payment modalities are bound to the consumer's domain.

As used herein, the term "domain" refers to a consumer's account including a hashed credit card (or other payment entity) identity and other identifying information. Rendering devices, such as computers or other players that are capable of rendering digital content so that it may be viewed by a consumer must be registered with the system, and are said to be "bound" to the "domain" of the consumer. The consumer typically has one "master domain" and may have more than one "sub-domain" and devices may be bound to more than one sub-domain. Binding the devices to a domain or sub-domain ensures that proper management of digital rights licenses may be carried out.

Referring again to FIG. 4, database 315 also provides for storage of data accessible by as well as generated by a customer care system 325, reporting system 330 and financial system 335. These systems are used to perform back office functions, such as, for example, providing access to a customer's transaction history and profile by customer service representatives, providing various reports related to monitoring the activities and transactions within the system, and providing financial monitoring and control.

An encoding system 340 provides for encoding or encrypting digital content to be delivered to a consumer. The encoding system 340 is in communication with a content management system 345, which in turn provides encrypted content through a content distribution system 350 to kiosk 305 for distribution to a consumer. Also includes is a digital rights management system 355 that monitors content being delivered and associates the appropriate digital rights license into the digital content that is delivered through the kiosk into the user's storage or rendering device 360.

Figure 5:
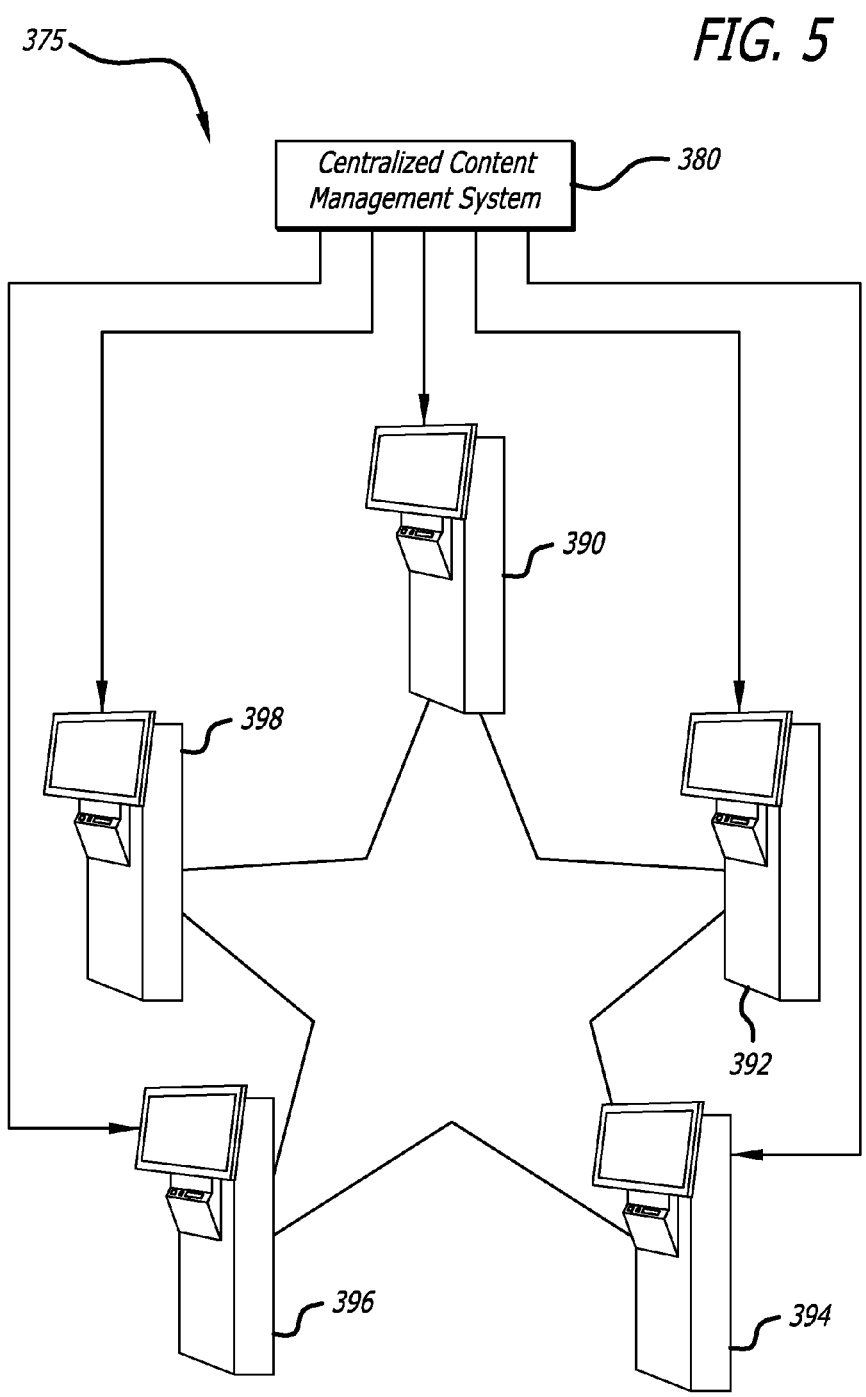
FIG. 5 is a schematic diagram illustrating an embodiment of the invention providing for peer to peer sharing of digital content between distribution kiosks.

FIG. 5 illustrates another embodiment of the present invention where a plurality of kiosks 390, 392, 394, 396 and 398 form a peer to peer grouping 375 and are configured to share digital content inventory among themselves in addition to being in communication with CMS 380. The kiosks may be connected together, either wired or wirelessly, so as to make requests for content from one another and to respond to those requests by sharing digital content that may be stored on one kiosk, but not on the kiosk making the request. The requests and responses are under the control of the content management and content distribution systems. The request and sharing processes will be discussed in more detail below.

As described previously, the content management system, or CMS, is a centralized system. The content distribution system, or CDS, resides on each kiosk. These systems allow the kiosk to pull down all appropriate content and software rather than having a centralized system push all updates to each kiosk. Thus, the kiosks may have unique content and software requirements, and the systems allow for updates based on the individual kiosk profile, location and/or requirements.

The CMS provides for management of all aspects of content and kiosk information. The CMS includes an extensive database that includes, among other data, SKU information, pricing, metadata and availability dates. In one embodiment, the CMS includes a web interface allowing operators of the system to manage all of the aspects of content stored and delivered by the system.

The CMS also specific features for optimizing the daily downloads of content to the kiosks. Software, system, availability windows, and metadata updates are prioritized to download first to ensure that the kiosk has the most current information. Such updates may be performed on a specific schedule, such as, nightly, weekly or the like, or, in some cases, an expedited update may be deemed to be necessary due to content requests from a kiosk or other reasons. Updating the system ensures, for example, when the update is done nightly, that the content and information available at the kiosk is never more than 24 hours out of date.

New releases of digital content not previously available may be given the highest priority to be downloaded. In the event that many digital files are released on any given day, new releases or digital content soon coming into availability will be downloaded ahead of digital files that may not be available until a later date. This ensures that each kiosk will have the highest priority content when it becomes available.

As stated previously, the CDS client resides on the kiosk. As each kiosk has a unique profile, the CDS client is configured to download relevant content and software to the individual kiosk upon which it resides. For example, a kiosk may be profiled as a test kiosk, and will receive content in advance of production to allow for testing. Once content and software have been validated at the test kiosk, the content and data may then be "promoted" to a "production" status, by the CMS, and then downloaded by kiosks having a "production" profile.

The systems provide for a kiosk-specific schedule for downloading content. Depending on availability of bandwidth, an operator may schedule content to downloaded to a kiosk during off peak hours. In the case where superior bandwidth exists, content can be downloaded for most of the day. Location specific content, such as marketing and promotional messages that may be geographically relevant to the location where the kiosk is located, may be downloaded by the system to the kiosk so that consumers at that kiosk will be presented with the location relevant marketing and promotional content.

Figure 6:
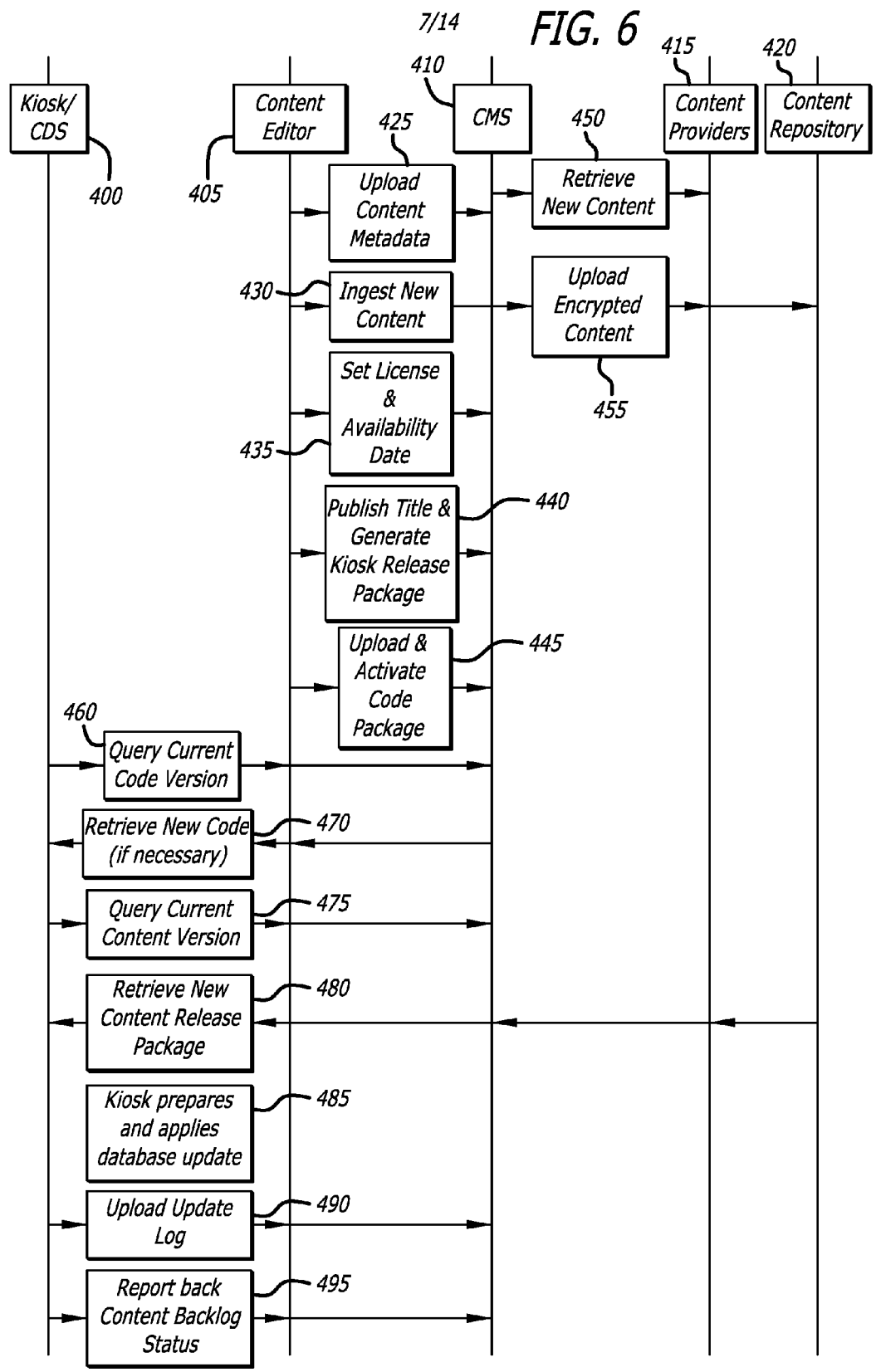
FIG. 6 is a block diagram illustrating a content publishing process and CDS daily update process in accordance with principles of the present invention.

FIG. 6 is a graphical illustrations of various tasks carried out by the software comprising the CMS and CDS. The flow chart illustrates a variety of information generating and receiving entities, and shows the flow of information from one entity to another. The entities are a kiosk/CDS 400, a content editor 405, a CMS 410, content provider(s) 415 and a content repository 420 (also known as an inventory) such as a server and associate storage.

As shown, a content publishing sequence is controlled by the CMS. In this sequence, which is not intended to be construed as occurring in the sequence in which each of the processes is described, the CMS 410 retrieves new content from content provider 415 in box 450.

The content editor 405 uploads content metadata 425 to the CMS 410. Content editor 405 also ingests new content 430 and uploads encrypted content 455 to the content repository 420. Content editor 405 also sets license and availability dates in box 435, for content and publishes titles and generates release packages of contents for downloading content to the kiosks in box 445 to the CMS 410.

In a code publishing sequence, the content editor uploads and activates a code package that is provided to CMS 410. The code package contains any and all modifications and alterations to the software, that is, the code version, running on and operating the kiosk functions.

The CDS resident in each kiosk also performs a sequence of tasks. While FIG. 6 indicates that the following sequence of tasks is carried out daily, other scheduling of the tasks may be used without departing from the intended scope of the invention. Moreover, the tasks, function and processes described may be performed in any order, and do not have to be performed in the order illustrated.

The CDS system in the kiosk performs a query 460 to determine what the current code version of the software operating the kiosk is by sending the query to the CMS 410. The kiosk CDS system then retrieves new code, or a new version of the code, from the CMS 410 if necessary in box 470. The CDS of the kiosk 400 performs a query of the current content version in box 475. If a new content release package has been generated in box 440, the kiosk retrieves the new content release package from the content repository 420 in box 480.

The CDS also may upload an update log detailing the various updates that have been made to the software and content of the kiosk at box 490. The CDS may also report the status of the backlog of content orders that have been received to the CMS 410 at box 495.

Peer to Peer Distribution Among Neighboring Kiosks

Referring back to FIG. 5, a group of kiosks may be interconnected with one another to form a peer group 375. Individual kiosks within the peer group may be configured to communicate with other kiosks of the peer group either by wire or wirelessly. In this manner, kiosks may make requests and respond to requests amongst members within the group. In one embodiment, all kiosks are ordered with a unique ID from 1 to n (or 0 . . . n−1), where "n" is the number of kiosks in the group. While the following description describes a series of functions or operations performed by an kiosk, it will be understood that those functions or operations are being carried out by one or processors or servers residing on each kiosk under the control of appropriate software commands provided by the software systems operating on the processor(s) or server(s) of the kiosk.

As described above, the CMS and CDS of each kiosk communicates with servers 225 (FIG. 3) to collect a list of digital content that is not present in the kiosk's own digital storage inventory and creates a "local_missing_list". Each kiosk creates its own local_missing_list, and that list that may or may not be unique to an individual kiosk.

Each kiosk communicates its local_missing_list to each of the members in the peer group. Upon receiving the requests, the receiving kiosk constructs and returns a list of the missing digital content it has and can provide as a source to the sending kiosk. For example, the receiving kiosk may create and send to the requesting kiosk a data filed entitled missing_content_source_list detailing where the sending kiosk may acquire the digital content it needs. The result of this are two lists whose superset list is its own local_missing_list:

The missing_content_source_list file contains a mapping of digital content to source kiosk, that is, where in the peer group this digital content exists on a peer kiosk. The missing_content_source_list may be a 1-to-n mapping, for example, movie A may be needed by kiosk 390 (FIG. 5) and be available from two sources, kiosk 392 and kiosk 398. This provides a redundancy in the event that the communication between, for example, kiosk 392 is lost, thus allowing for the content to be retrieved from kiosk 398.

A global_missing_list is created from the local_missing_lists of each kiosk. This list contains a list of digital content that are commonly missing from the group, that is, anything from all peer kiosk local_missing_lists that does not have a source kiosk is on this list. Each one of the kiosks retrieves the digital content from the global_missing_list from the Content Management System servers that is on the kiosk's local_missing_list. The unique IDs of the Kiosks in the group are used to identify the movies that each kiosk has in its own digital storage. For example, if there are two in the group, then the first kiosk would retrieve all the odd numbered ones, and the other kiosk would retrieve all the even numbered ones.

Each kiosk makes a request to the source peer to retrieve the digital content of each movie on its own missing_content_source_list. For each movie on the global_missing_list that's not retrieved by the kiosk, each kiosk makes a request to the source peer to retrieve the movie. Eventually all movies from the list will be retrieved.

Credit and Device Domain Registration

Referring briefly to FIG. 3, the system includes a web site 230 where a potential customer may link through an Internet connection to create an account and register their devices with system. This process links the customer's credit card identification information to the devices in their business account to the devices in the customer's device domain such that when the customer swipes their credit card at a kiosk during a purchase or rental process, the system knows the customer and causes digital rights management (DRM License) and domain servers to create the appropriate DRM License to be associated into the digital content file allowing the file to be rendered only on devices registered to the customer's device domain. This pre-registration process, however, may, for a variety of reasons, be inconvenient for the potential customer and/or interfere with the impulse nature of the kiosk purchase.

Alternatively, when a customer uses a kiosk in the system for the first time, the user's device domain is unknown. In this embodiment, the point of content delivery system of the kiosk will create a new user credit and device domain. The device registration is accomplished through the interface system of the kiosk, or alternatively, by connecting a rendering device to the kiosk, which will then be connected to a domain server of the system through the Internet solely for the purpose of registering the customer and establishing a credit domain for the customer and also registering the rendering device to the customer's Device Domain and forging the appropriate connections between the customer's credit domain and device domain to allow the customer to purchase or lease digital content to be played on the registered device. The domain server obtains certain information necessary to uniquely identify the customer's rendering device and delivers a certificate to the rendering device identifying it as registered to the customer's device domain and links that device domain to the customer's account. Once this process is completed the digital content will be downloaded onto the rendering device, along with an appropriate DRM license so that the content can be played on the registered rendering device.

In another embodiment, a customer account may contain a single credit card domain that is linked to multiple rental domains. This is a method to bind a device-group license to a device by combining a credit card hash with some unique ID representing a player installation (MAC Address) resulting in a device-specific license.

When a movie is rented from the system, a rental or a purchase license is embedded in the movie file delivered to the customer. A rental license is typically valid for a specific period of time, such as, for example, 30 days. After such time, the license is programmed to expire, and render the digital content unplayable unless the license is renewed.

On first viewing of movie, the license expiry may be reset to, for example, 48 hours from the start of rendering. In one example, the license terms may be such that a movie with a rental license can be watched on only one device at a time, while a movie with a purchased license may have no expiry period and may be viewed on any number of additional devices. The number of allowable devices may be limited by the operator of the system to, for example only, but not limited to, up to five devices at a time. For the purpose of tracking and enforcing the license restriction, the system may use a domain based DRM where the term "domain" means a device group. This domain is identified by associating the customer's rental and purchase domains to a hash of the customer's credit card number used for the transaction. The hash is created by applying an encryption algorithm to the customer's credit card number, typically using a private key method such as is well known in the art to ensure the security of the customer's credit card number and information. The credit card number itself is never used in any part of the license generation.

For this example, the rental restriction requires that movie can be played on only one device at any given time. In traditional DRM implementations this is accomplished by issuing a device-specific license (referred to as "Direct License Acquisition"). To issue the device-specific license either the rendering device must be connected to a license server through the Internet to receive the license or the license server itself must store data to generate, encrypt and sign the license that can be decrypted only by the correct device. Since the system in accordance with the present invention does not require a device to be connected to the Internet at the time of rendering, the traditional DRM implementation schemes do not work.

In various embodiments of the present invention, multiple rental domains are simulated with the same credit card by associating a rental domain to the credit card number hash and a unique ID representing player installation on a device. Using this method, the system binds a device-group license to a device.

In addition to satisfying the business requirements above, the scheme has another advantage over the traditional device license in that the license on the device is decoupled from the issuing server. In the traditional DRM implementation, if for any reason the receiving device becomes unavailable, such as, for example, due to device fail or theft, a new license must be issued. Utilizing the method described above, the various embodiments of the system of the present invention do not need to reissue a DRM license if a rendering or rendering device becomes unavailable to move the license to another registered rendering device.

In practice, the customer swipes their credit card at a kiosk and the kiosk queries the operator's servers to obtain all device IDs that have been associated with the credit card. The Kiosk may display friendly names for each of the device IDs to more easily allow the customer to select the rendering device they want or to select a new location. The Kiosk joins the customer device-group for the credit card and player device, requests a DRM license for the group, embeds a license in the file to be delivered to the customer and leaves the group. This enables the operator to issue a license without requiring a customer's rendering device be connected to the kiosk. A rendering must include the client software application described previously, and the client application will refuse to rendering the content if the license does contain a matching device ID. If no rendering device ID is associated with the license, the data on licensing server is updated to link the credit card hash with a new rendering device ID.

FIGS. 7A-7E are graphical illustrations of the methods and systems employed by various embodiments of the present invention to carry out a transaction on the system to rent or lease digital content. The flow chart begins with a user 502 who goes to a kiosk 504, and interacting with the kiosk's interface, shops for digital content at box 512. Once the customer has selected content to be purchased or leased, the customer interacts with the kiosk's interface to complete the purchase at box 514.

To complete the purchase or rental, the kiosk interface may prompt the customer to insert his or her credit card at box 516. The customer inserts his or her credit card into a reader of the kiosk and the kiosk reader reads the card and may authenticate the card at box 520. The kiosk may then prompt the customer to determine whether the digital content is to be rented or purchased at box 520. If the digital content is to be rented, the user interface of the kiosk 504 displays a list of devices registered to the customer's credit card domain and requests the customer to select from among the list of devices the device to be used to render the digital content in box 527.

Figure 7A:
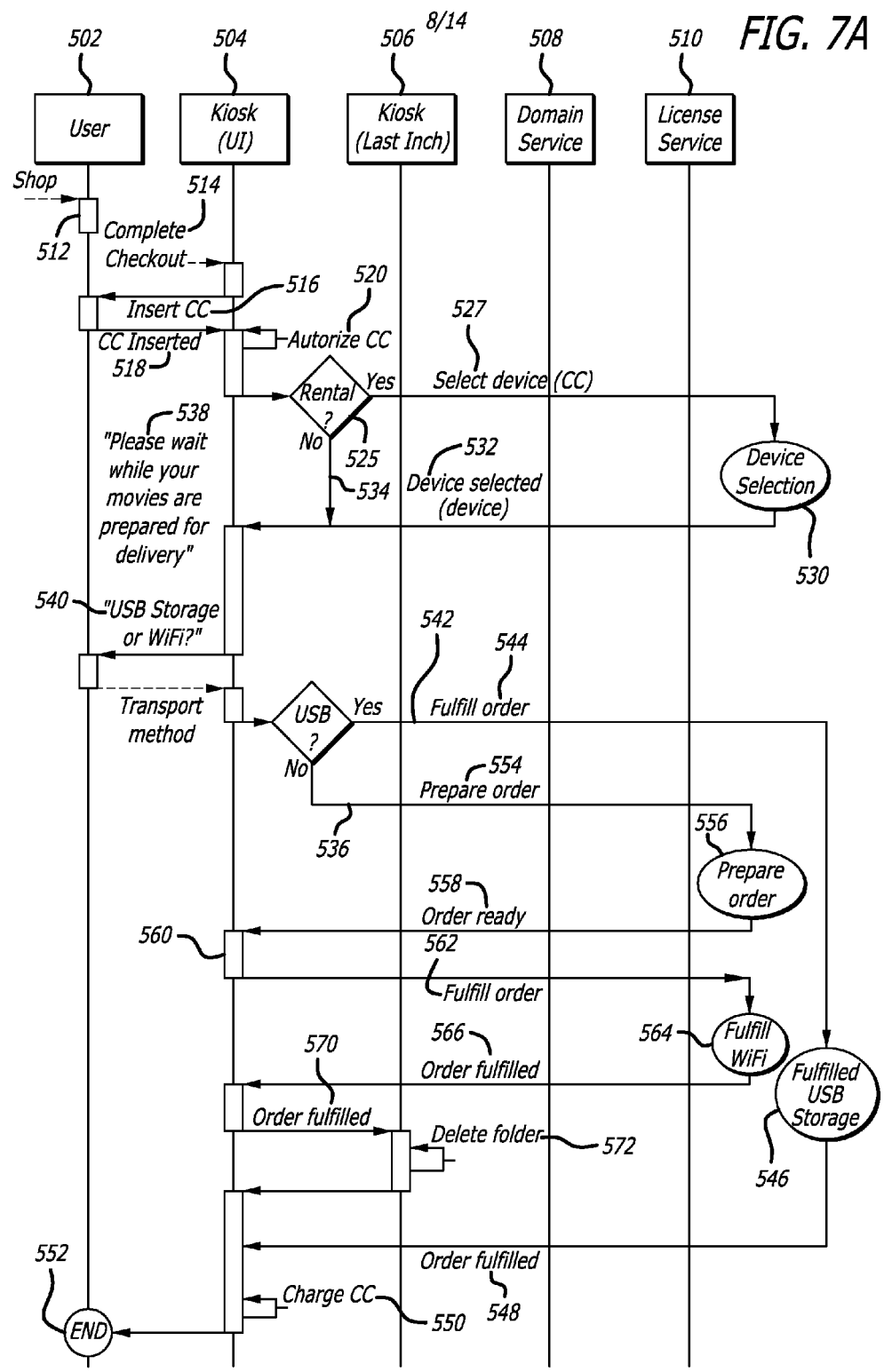
FIG. 7A is a block diagram illustrating an exemplary sequence of transactions carried out to fulfill a purchase or lease of digital content in accordance with principles of the present invention.
Figure 7B:
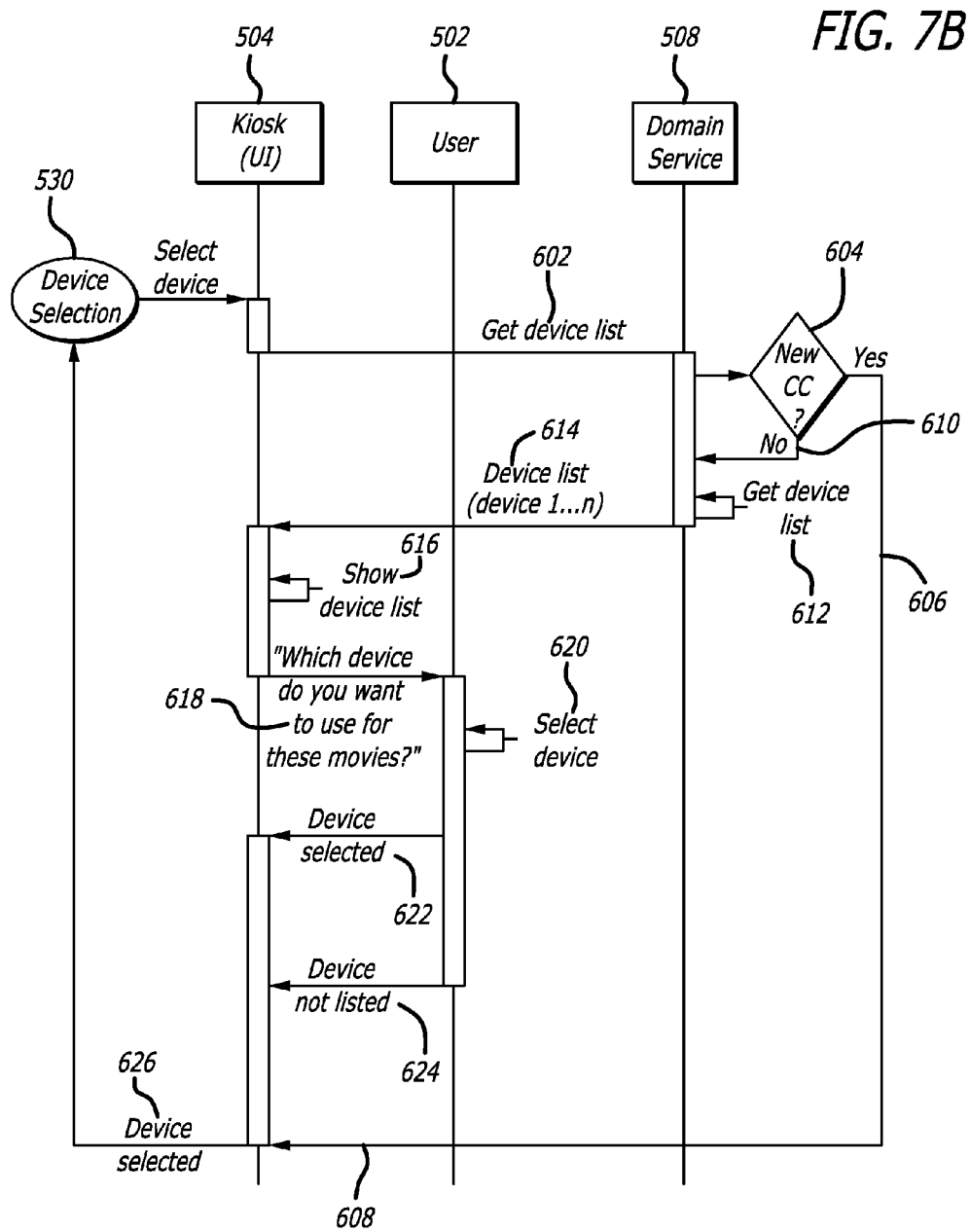
FIG. 7B is a block diagram illustrating an exemplary sequence of operations that occur during a device selection process of FIG. 7A.
Figure 7D:
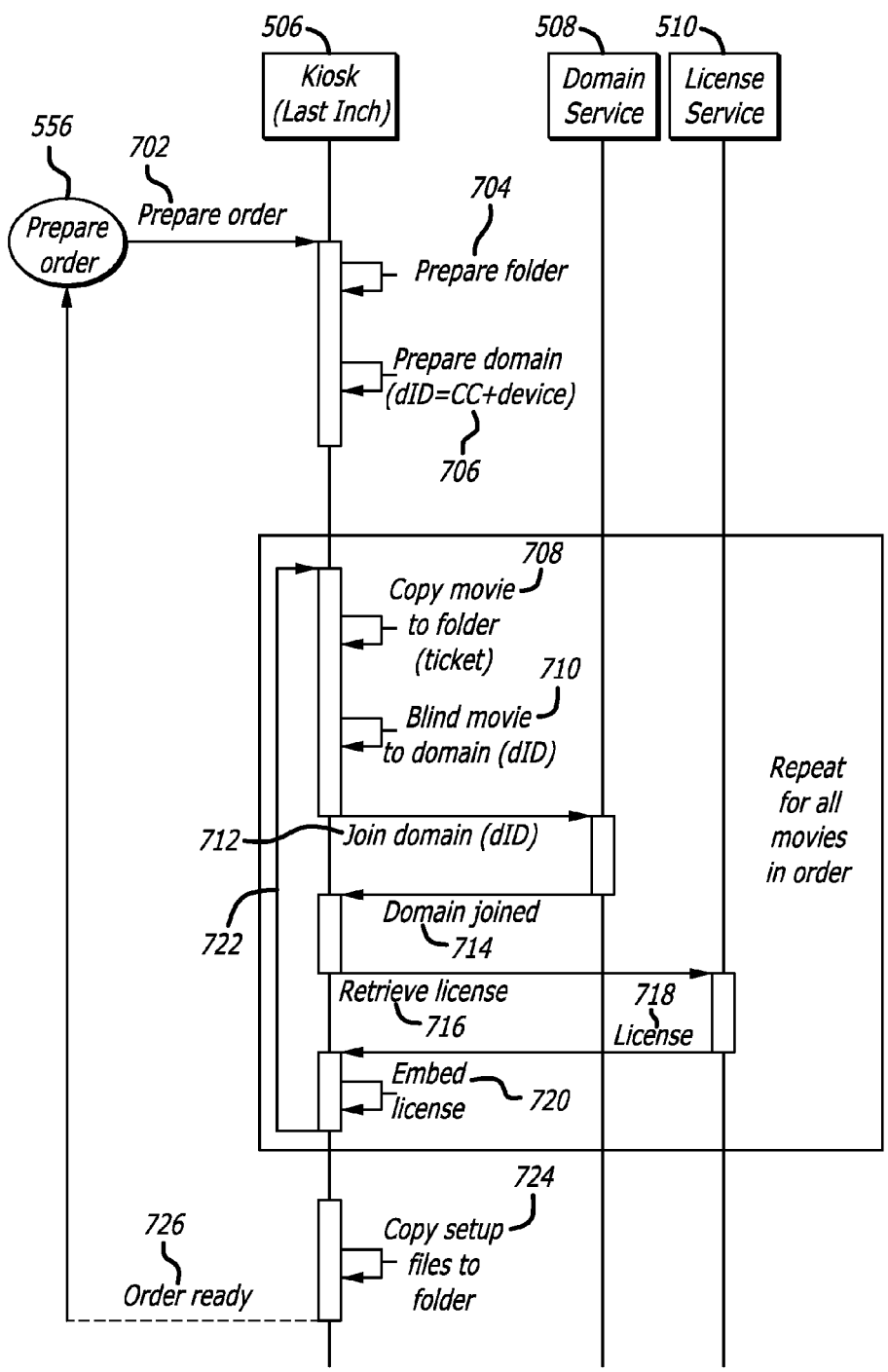
FIG. 7D is a block diagram illustrating an exemplary sequence of operations occurring during a prepare order process of FIG. 7A.

The device selection process 530 is described with reference to FIG. 7B. This process begins with a query 602 from the kiosk 504 to the domain server 508 requesting a list of devices that are bound to the customer's credit card. The domain server 508 inquires whether the customer's credit card is a new card at box 604, and if it is a new credit card, sets a "device" flag to 0 at box 606, and the process branches back to the kiosk at box 608. If the credit card is registered, box 610, with the domain server 508, the domain server retrieves a list of registered devices at box 612, and transmits the device list at box 614 to the kiosk 504. The kiosk then displays the list of devices to the customer at box 616 and requests the customer to select from the list of registered devices at box 618. The customer 502 selects the device to be used to render the selected digital content at box 620. After customer 502 selects the device for use to render the selected digital content at box 622, the identification of the selected device is returned as the result of the device selection process 530 at box 626.

In some instances, the customer 502 may decide he or she wants to use a device that is not listed, signified by box 624. If this occurs, then "device" is set to 0 and a device not selected result is returned as the result of the device selection process 530. At this point, the process branches to a sub-process that allows the customer to register the new device, which is then added to the list of registered devices associated with the customer's credit domain. The listed new device is then returned as the result to the device selection process 530.

Referring again to FIG. 7A, the result of the device selection process 530 is returned to the kiosk 504 at box 532. The kiosk may then display a variety of messages to the customer 502, such as, for example: "Please wait while your movies are prepared for delivery" at box 538. The kiosk will also prompt the user to select between method for delivering the content to the user, such as by requesting whether the customer desires the content to be delivered using a USB device or whether the content is to be delivered directly to a rendering device using a wireless delivery method, such as over a Wi-Fi network at box 540.

If the customer desires the digital content to be delivered using USB at box 542, the kiosk attempts to fulfill the order by communicating a fulfill using USB signal 544 to the fulfill USB storage process 546.

The fulfill USB storage process 546 is illustrated by the flow chart of FIG. 7C. Once the fulfill USB storage process is activated, the kiosk prompts the customer to insert a USB storage device into a USB slot 245 (FIG. 3) at box 652. Once the USB device is inserted at box 654, a subsystem of the kiosk CDM, herein referred to as the "last inch" of the kiosk) 506 is used to carry out the processes necessary to ready the digital content for download and to control the download process. The term "last inch" is used herein to refer to digital content delivery via a USB connection. The term "last meter" is used herein to refer to digital content delivery via a wireless connection between the kiosk and a rendering device or storage media.

Kiosk "last inch" process 506 first checks the USB device at box 656. Once that check is completed, and the USB device is determined to be acceptable, that is, it is functioning, is supported by the output port of the kiosk, and has a enough storage space to accept the digital content, the "last inch" process 506 sends a signal to the processor of the kiosk that the USB device is ready for transfer of the selected digital content at box 662. At this point, the kiosk may present the customer with a message, such as "Please wait while your movies are transferred to your USB device" or the like at box 664. It will be understood, however, that such a message would not be necessary if the digital content is able to be transferred to the USB device is only a brief period of time, which can be determined by the kiosk at the time of transfer.

After determining that the USB device is ready, the kiosk process 506 begins the process of associating the selected digital content with a DRM license at box 666. At box 668, a download domain, dID is prepared by linking the customer's credit card and device into a unique identification, as was described previously. This unique identification is bound to the selected digital content at box 670. A signal is then sent from kiosk 506 to the domain service server 508 requesting that the domain service join the kiosk to the same domain, and once the domain is joined at box 674, the kiosk process 506 communicates with license server 510 requesting a license be granted to allow rendering of the selected digital content at box 676. License service server 510 provides a license for the selected digital content at box 678 to kiosk process 506 which then embeds the license in the digital content to be delivered at box 680. Kiosk process 506 then transfers the digital content and embedded license to the USB device 650 at box 682. When the transfer is complete at box 684, the kiosk indicates that the digital content has been delivered at box 686. This indication may take the form of a message presented to the customer, or some other indication that the transfer is complete.

If more than one content item has been selected for purchase or rental by the customer, kiosk process 506 may indicate that the transfer of one or more of the selected content items has been transferred, and inform the customer that the remaining selected items are being prepared for transfer, or are unavailable for transfer, and ask the customer if the customer wishes to wait for the transfer to be completed, or whether the customer wishes to complete the transfer at a later time. If the delivery is to be continued at a later time, other delivery options may be presented to the customer, such as a prompt for the customer to select the delivery route, or location for delivery.

In the case where more than one content item has been selected, the process described in references to boxes 670 to 686 is repeated for each content item selected until all of the content items have been delivered, or the customer notified that one or more of the items could not be delivered, as described above. Once all of the digital content items are delivered, kiosk 506 un joins itself form the dID domain.

Once all the content items have been delivered, or at least when all of the currently available content items have been delivered, kiosk process 506 transfers setup file and other software, such as, for example, a video/audio player and any DRM applications needed to render the digital content to USB device 650 at box 690. When the transfer is completed, as indicated by box 692, kiosk process 506 determines whether the order has been fulfilled at box 694, and if so, indicates that the order is fulfilled at box 696, creating a "ticket" that uniquely identifies the delivered digital content, DRM license, and credit card and device domains to which the digital content has been bound. This ticket becomes an output of the fulfill USB storage process 546 in box 698. This result is received by the kiosk in box 548, which then causes the kiosk 504 to charge the customer's credit card for the purchase of the ticket and digital content in box 550, ending the process at box 552.

If the customer choose Wi-Fi delivery of the ordered content at box 536, the kiosk communicates a prepare order signal 554 to a prepare order process 556. Prepare order process 556 is described in detail with reference to FIG. 7D.

The prepare order process 556 begins by sending a prepare order communication, which includes the credit card and selected device information, to kiosk process 506. Kiosk process 506 prepares a folder that includes a ticket at box 704. A unique identification domain using the credit card and device identification information is prepared at box 706. The selected digital content is then associated with the folder at box 708, and the selected digital content is bound to the domain at box 710. A request to join the domain is communicated to the domain server 508 at box 712, and the domain server returns a communication indicating that the domain is joined to kiosk process 506 at box 714. Kiosk process 506 then requests a DRM license from license server 510 at box 716, and the license is returned to kiosk process 506 from license server 510 at box 718. The license is then embedded into the selected digital content at box 720.

If more than one content item has been requested by the customer, the process of boxes 708 to 720 is repeated following path 722 until all of the selected content items are processed and are ready to be delivered to the customer. Once all of the selected content items are processed, kiosk process 506 copies setup files to the folder for each of the selected content items and an "order ready" signal is communicated at box 726 as the output of the prepare order process 556.

The order ready signal is the communicated as a "ticket" to the user interface of the kiosk 504 in box 558. The ticket may take several forms, for example, but not limited to, the ticket may be the last four digits of the customer's credit card number. Once the user interface of the kiosk 504 receives the ticket at box 560, the kiosk 504 sends a fulfill order communication 566 to a fulfill Wi-Fi process 564.

Figure 7E:
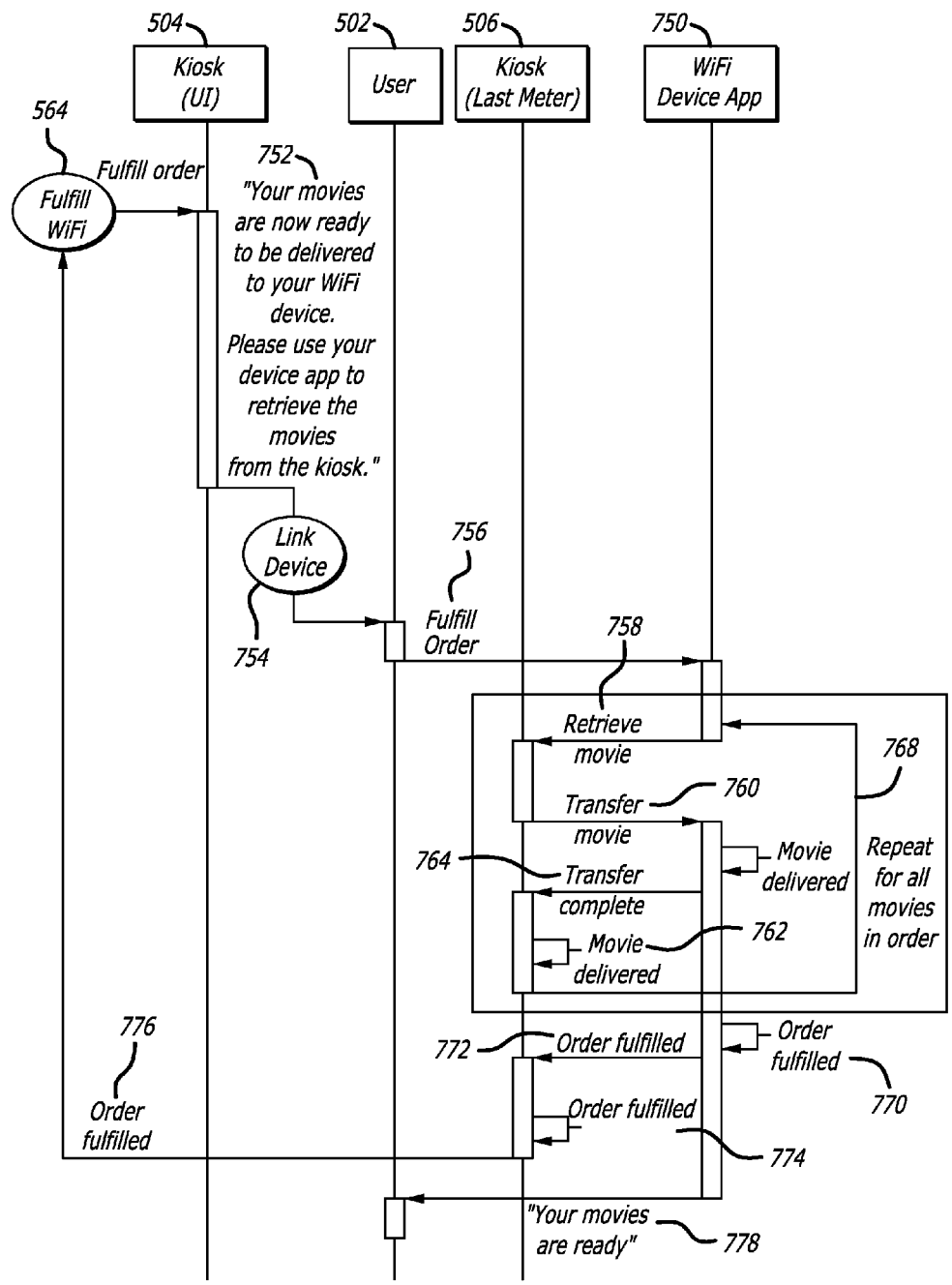
FIG. 7E is a block diagram illustrating an exemplary sequence of operations occurring during a fulfill Wi-Fi process of FIG. 7A.

The fulfill Wi-Fi process 564 is described in detail with reference to FIG. 7E. Kiosk 504 provides a prompt in box 752 to the customer that the digital content is ready to be transferred via Wi-Fi to the customer's rendering or storage device and is requested to activate the software application 750 provided by the system operator and loaded onto the customer's rendering or storage device to begin the transfer process. The transfer process cannot be initiated unless it is initiated from the software application resident on the customer's rendering or storage device.

Once the software application 750 on the customer's device has linked to the kiosk in box 754, the ticket is communicated to the software application 750 in box 756. Software application 750 communicates with kiosk process 506 to begin retrieval of the selected digital content in box 758, and kiosk process 506 transfers the selected digital content to the rendering device in box 760. Once software application 750 determines that the content has been delivered to the rendering device, software application 750 sends a transfer complete signal 764 to kiosk process 506 and kiosk process 506 flags that content as having been delivered in box 766. Software application 750 may also provide an indication on the rendering device indicating that the transfer is complete at box 762. The process described in boxes 758 to 766 may be repeated for each content item ordered until all of the content items have been delivered.

Software application 750 receives each content item via a series of byte-range requests, also known as "chunks" of digital content. Kiosk process 506 maintains a record of the chunks that have been delivered, and monitors the time between chunk requests. If the time between chunk requests exceeds a selected threshold, the delivery process "times out" and the process is halted. Such time outs may occur due to Wi-Fi connection problems which may result from a number of conditions. In any case, the process may be reinitiated by the customer from the software application 750, and content delivery will resume.

Time out in the delivery process may also occur in the example of a customer purchasing digital content while at an airport. The process may begin while the customer is waiting to board an airplane, but for a variety of reasons, may not be able to be completed before the customer boards the plane. In this instance, moving away from the kiosk will interrupt the delivery of the content, and kiosk process 506 will time out. When this occurs, the process is suspended until delivery can be completed, and the customer's credit card is not charged for the content delivery until delivery is completed. Where more than one content item is ordered, the customer will be charged only for those content items that were successfully delivered before delivery was suspended. In such cases, software application 750 notifies the customer which content items have been delivered and paid for, and those items for which the delivery process needs to be completed.

Once the entire order has been fulfilled, as determined by the software application 750 at box 770, the software application sends an order fulfilled communication 772 to kiosk process 506 which checks to determine if the order has indeed been fulfilled at box 774, providing an "order fulfilled" communication as a result of fulfill Wi-Fi process 564 in box 776.

Process 564 then provides an order fulfilled ticket to kiosk user interface 504 at box 566, which then sends the ticket to kiosk process 506 in box 570, causing kiosk process 506 to delete the folder (ticket) at box 572, and then charging the customer's credit card at box 550 for the delivered content, ending the process at box 552.

Figure 8A:
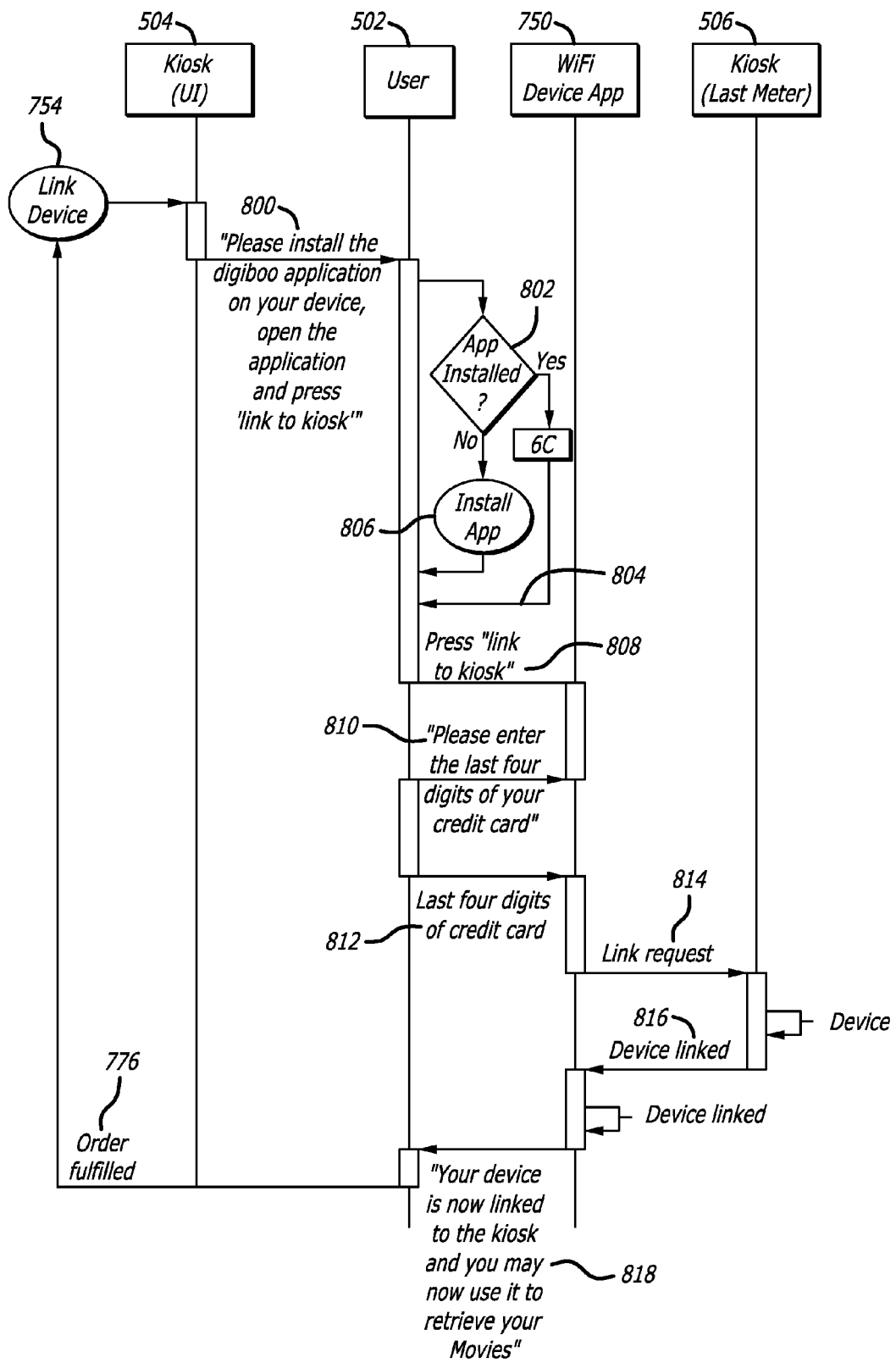
FIG. 8A is a block diagram illustrating an exemplary sequence of operations occurring during a link device process of FIG. 7E.
Figure 8B:
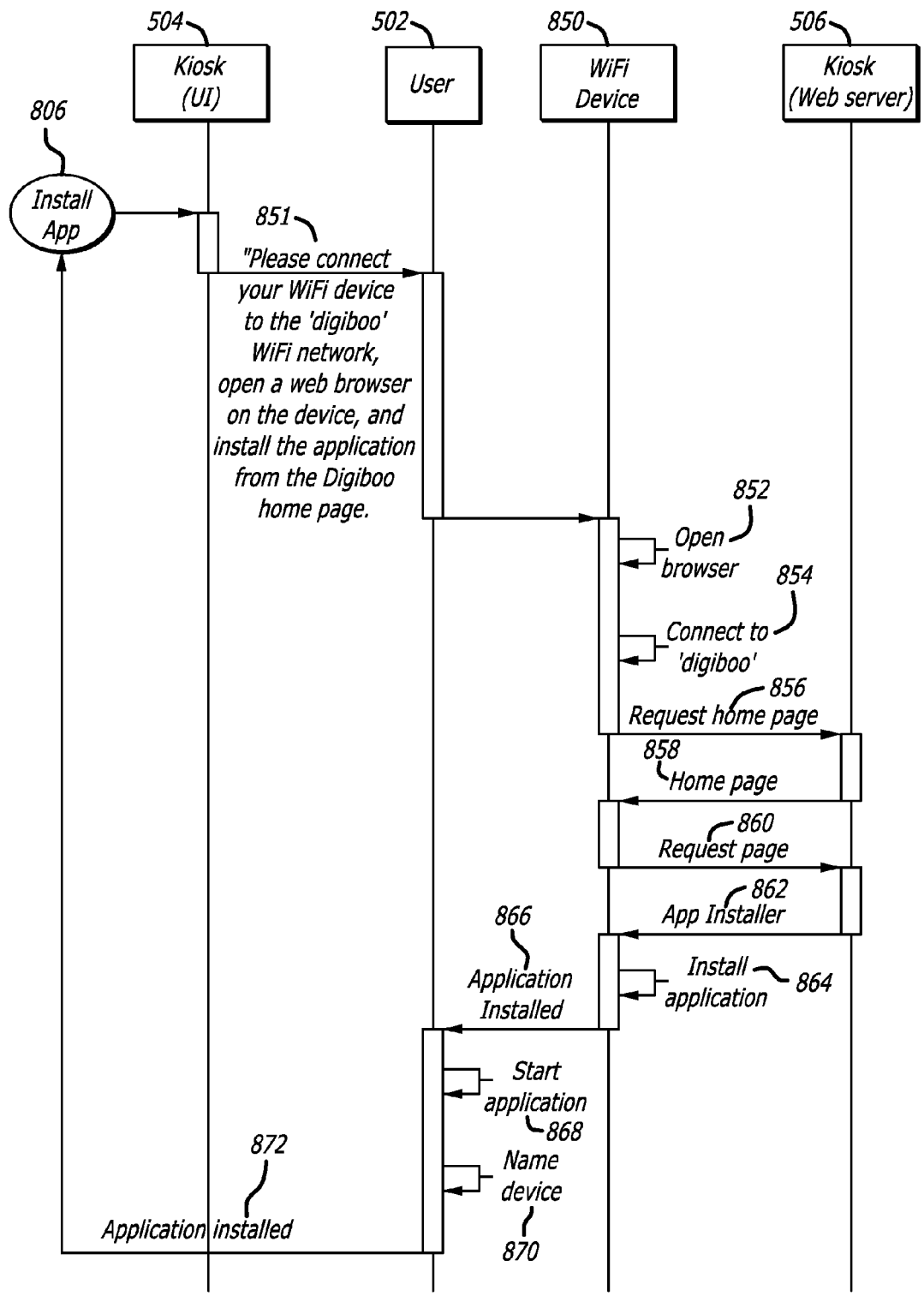
FIG. 8B is a block diagram illustrating an exemplary sequence of operations occurring during an install application process of FIG. 8A.

FIGS. 8A and 8B describe the process to be used when the customer's rendering device does not have software application 750 resident on the rendering device to which the selected digital content is to be delivered. These processes are performed during the link device process 754 described above.

Kiosk user interface 504 may ask the customer whether software application is resident on the customer's selected rendering device. If not, as will likely be the case where the device is not registered with the system, the user will be asked to install the software application 750 on the rendering device at box 800. This determination of whether the application is present or not occurs at box 802. If software application 750 is present on the rendering device, then path 804 is followed, and the customer is prompted to activate the software application and press a link provided by the software application to link the rendering device to the kiosk to facilitate delivery of the digital content selected by the customer at box 808. In one embodiment, the customer is then prompted to enter the last four digits of the customer's credit card in box 810, and upon entry by the customer in box 812, software application 750 generates a ticket from that entry and generates a link request to kiosk process 506 in box 814. Once the link request is accepted by kiosk process 506, kiosk process 506 communicates that the devices are linked to the software application 750 in box 816. Software application 750 then generates a message to the customer informing the customer that his or her devices is linked to the kiosk, and that the customer may now use the software application running on the rendering device to retrieve the digital content selected by the customer for purchase from the kiosk to the customer's rendering device in box 818.

When the determination 802 of whether software application 750 is installed on the customer's rendering device 850 indicates that software application 750 is not installed, the process invokes the "install application" sub-process 806. Sub-process 806 is described with reference to FIG. 8B.

In sub-process 806, kiosk user interface 504 provides a message to the customer in box 851 instructing the customer to connect the Wi-Fi rendering device 850 to a web site run by the operator of the system and then download the software application from the web site. The customer opens a web browser on the rendering device in box 850 and navigates to the operator's web site in box 854, requesting to be connected to the kiosk's home page in box 856. Once the kiosk's home page is displayed on rendering device 850, the customer may request that the software application 750 be downloaded from the kiosk in box 862. Once software application 750 is downloaded onto the rendering device 850, the application is installed on rendering device 850 in box 864.

The customer may then start software application 750, as noted by box 868, and provide a name to be used to identify the device in box 870. Once this is completed, the application is installed, as indicated by box 872, and the install application 806 sub-process is completed, and the process branches back to box 808 (FIG. 8A) where the customer is prompted to link to the kiosk to begin the content delivery process.

While the above illustrated process has been described with reference to a customer using the user interface of a kiosk as a primary mode of interacting with the system, other methods are possible, such as using a registered rendering device as an interface to the processor of a kiosk, or even, through a network connection, such as the Internet, communicating with the servers of the system to transact an order which may then be fulfilled when the customer comes into close enough proximity with a kiosk to effect delivery of the content stored at that kiosk location. For example, a customer may order content using a web site provided by the operators of the system, and then "pick up" the content when customer arrives at the location of a kiosk, such as at an airport.

In another example, the customer may only need to be close enough to a kiosk so that the customer may wirelessly communicate with the kiosk. For example, a customer is at an airport waiting to board a plane, and a kiosk is within wireless communication range of the customer's computer, tablet, smartphone or other rendering device. Using an application resident on the rendering device, the customer may establish a communication session with the kiosk and perform all of the tasks described above to search for digital content and to purchase or rent selected digital content.

All of the systems and method described above function to allow a customer to complete a transaction on a kiosk and elect to receive the customer's digital content selections because the system of the kiosk creates and delivers a unique reference identification for the digital content ordered by the customer. In one embodiment, this unique reference identification may be a combination of the last four digits of the customer's credit card number and the credit card billing address zip code. Such a combination is sufficiently unique such that the system can ensure that one customer's order will not be inadvertently delivered to another customer. This combination is also advantageous in that it does not require the customer to receive and use a difficult to remember "ticket number" before the content is delivered to the customer.

For example, where a customer has previously placed an order at the system operator's web site, the customer simple goes to, or connects to via the customer's rendering device, and enters their unique "ticket number" into the kiosk user interface or software application on the customer's rendering device, confirms the pending order, and the digital content is delivered to the customer. The unique identifier can then be stored by the software application resident on the rendering device so that the customer need only enter the identifying information once for each rendering device used by the customer.

Once a customer's order has been delivered to the customer's rendering or storage device, the customer's credit card is billed. If the customer has indicated the customer desires a receipt for the transaction, the receipt may be transmitted to the customer by mail, email, wireless text or other method.

Digital Filling Station for Digital Locker Content

In another embodiment, the various systems and method of the present invention may be employed to provide access to a customer's digital rights locker, such as, for example, an UltraViolet™ or Keychest™ account, and to link the digital rights locker account to the customer's account provided by the operators of the system. This embodiment allows the customer to request delivery of any digital content stored on a kiosk for which the customer has a valid digital rights locker license. For example, in this case, the kiosk would serve as a licensed digital rights locker download provider, such as, for example, a licensed UltraViolet download service provide.

In another embodiment, the customer may utilize the kiosk to purchase and download digital content stored at the kiosk wherein the kiosk holds digital locker rights, such as, for example, UltraViolet rights, to the content. In this case, the kiosk functions as both an UltraViolet licensed retailer and download service provider. It will be understood that the term "digital rights locker" includes all such services, and is not intended to be limited to describing only the UltraViolet or Keychest services.

While several particular forms of the invention have been illustrated and described, it will be apparent that various modifications can be made without departing from the spirit and scope of the invention.

We claim:

1. A method for providing transportable digital rights management licenses for providing for playback of licensed digital content on a rendering device in the absence of a connection to a network connecting the content rendering device with a digital rights management license server, comprising:
   a. assigning, by a computer, a rendering device to a unique device domain;
   b. receiving by the computer a credit card number from a customer;
   c. generating a hash of the credit card number by the computer;
   d. associating the unique device domain with the hash of the credit card number by the computer;
   e. creating a transaction domain by the computer using the associated unique device domain and hash of the credit card number; and
   f. associating, by the computer, a digital rights management license with the transaction domain.

2. The method of claim 1, further comprising:
   g. embedding the digital rights management license in a selected item of digital content; and h. communicating the selected item of digital content with the embedded digital rights management license to a customer.

3. The method of claim 2, further comprising:
i. communicating a digital content player configured to render digital content in viewable form only if the digital content being viewed includes an embedded digital rights management license to the rendering device having the assigned unique device domain.

4. The method of claim 2, wherein the communicating the selected item of digital content with the embedded digital rights management license to the customer includes downloading the selected item of digital content with the embedded digital rights management license to a portable memory.

5. The method of claim 2, wherein the communicating the selected item of digital content with the embedded digital rights management license to the customer includes downloading the selected item of digital content with the embedded digital rights management license to a rendering device.

6. The method of claim 1, further comprising:
j. receiving an indication from a customer that the customer is renting a selected item of digital content; and
k. wherein the transaction domain includes only a single unique device domain.

7. The method of claim 1, further comprising:
l. receiving an indication from a customer that the customer is buying a selected item of digital content; and
m. wherein the transaction domain includes only a single unique device domain.

* * * * *

UNITED STATES PATENT AND TRADEMARK OFFICE
CERTIFICATE OF CORRECTION

PATENT NO. : 8,560,455 B1  
APPLICATION NO. : 13/713569  
DATED : October 15, 2013  
INVENTOR(S) : Mithila Raman et al.

Page 1 of 2

It is certified that error appears in the above-identified patent and that said Letters Patent is hereby corrected as shown below:

In the specification:

Column 4, line 38, between "on" and "whether" delete "the".

Column 5, line 58, after "a method" delete "for".

Column 7, line 33, between "delivery" and "digital" insert --of--.

Column 9, line 37, between "Devices" and "flash" delete "have" and insert instead --having--.
   line 44, between "of" and "into" delete "date" and insert instead --data--.
   line 64, between "flash" and "such" delete "cared," and insert instead --card--.

Column 10, line 16, between "available" and "the" insert --in--.
   lines 50-51, between "for" and "retail" delete "manage and monitor" and insert instead --managing and monitoring--.

Column 14, line 2, between "be" and "constant" insert --in--.
   line 16, between "235." and "Escrow" insert --The--.
   line 48, between "embodiment," and "output" insert --the--.

Column 16, line 40, between "Also" and "is" delete "includes" and insert instead --included--.

Column 17, line 6, between "also" and "specific" insert --has--.

Column 18, line 51, between "data" and "entitled" delete "filed" and insert instead --file--.

Column 20, line 63, between "on" and "licensing" insert --the--.

Column 21, line 65, after "kiosk" delete ")".

Signed and Sealed this  
Twenty-ninth Day of July, 2014

Michelle K. Lee  
*Deputy Director of the United States Patent and Trademark Office*

CERTIFICATE OF CORRECTION (continued)
U.S. Pat. No. 8,560,455 B1

Column 23, line 39, between "is" and "communicated" delete "the".

Column 25, line 4, between "devices" and "linked" delete "is" and insert instead --are--.
       line 45, between "when" and "customer" insert --the--.